United States Patent [19]

Lumelsky

[11] Patent Number: 5,291,275
[45] Date of Patent: Mar. 1, 1994

[54] TRIPLE FIELD BUFFER FOR TELEVISION IMAGE STORAGE AND VISUALIZATION ON RASTER GRAPHICS DISPLAY

[75] Inventor: Leon Lumelsky, Stamford, Conn.

[73] Assignee: International Business Machines Incorporated, Armonk, N.Y.

[21] Appl. No.: 541,425

[22] Filed: Jun. 20, 1990

[51] Int. Cl.⁵ .................... H04N 7/01; H04N 5/907
[52] U.S. Cl. .................... 348/441; 348/571
[58] Field of Search ............ 358/11, 140, 160, 21 R, 358/149; H04N 7/01, 11/20, 5/907

[56] References Cited

U.S. PATENT DOCUMENTS

| | | |
|---|---|---|
| 3,970,776 | 9/1976 | Kinuhata et al. . |
| 4,276,565 | 6/1981 | Dalton et al. ............ 358/140 |
| 4,322,750 | 3/1982 | Lord et al. ............ 358/140 |
| 4,344,075 | 8/1982 | Rudy . |
| 4,463,372 | 7/1984 | Bennett et al. . |
| 4,480,267 | 11/1984 | van den Avoort et al. . |
| 4,484,188 | 11/1984 | Ott . |
| 4,518,984 | 5/1985 | Mitschke . |
| 4,660,070 | 4/1987 | Nishi et al. . |
| 4,694,325 | 9/1987 | Mehrgardt . |
| 4,694,348 | 9/1987 | Kamiya et al. . |
| 4,698,674 | 10/1987 | Bloom . |
| 4,797,743 | 1/1984 | Miyazaki ............ 358/149 |

FOREIGN PATENT DOCUMENTS 0264726 10/1987 European Pat. Off. .
0244183 10/1986 Japan .

OTHER PUBLICATIONS

"Improved Definition Television" by L. Feldman, Radio Electronics, Jan. 1989, pp. 43-45, 68 and 76.
"High Picture Quality Digital TV for NTSC and PAL Systems", IEEE Transactions on Consumer Electronics, vol. CE-30, No. 3, Aug. 1984.
Electronics and Communications in Japan, vol. 57-A, No. 10, Oct. 74 pp. 56-63 K. Kinuhata et al, "Analysis of Field Correspondence and Field Memory Capacity in TV Standards Conversion".
IEEE Transactions on Consumer Electronics, vol. 35, No. 3 Aug. 1989, pp. 614-622, T. Tatsimi et al, "The Video Processor For A Personal Computer".

*Primary Examiner*—James J. Groody
*Assistant Examiner*—David E. Harvey
*Attorney, Agent, or Firm*—Perman & Green

[57] ABSTRACT

Image conversion method and apparatus that provides for (a) storing in a first memory a first image field; (b) storing in a second memory a second image field; (c) reading the first and the second memories; (d) simultaneously displaying on a display screen the first and the second image fields as a single image frame; and (e) while performing the step of reading the method includes a step of storing in a third memory a third image field. The first, second and third memories are provided as a frame buffer having a 3×3 memory block organization. For image fields numbered 1, 2, 3, 4, 5 ... n ... the system of the invention reads the image fields two at a time in accordance with a predetermined sequence given by: 1 and 2, 2 and 3, 3 and 4, 4 and 5, (n−1) and n, n and (n+1). A high resolution frame length is selected to be longer than or shorter than a television field period. The phase difference between the two is measured and circuitry alters the predetermined read-out sequence to ensure that a field memory to be read will not also be required for simultaneously storing a next television field.

39 Claims, 19 Drawing Sheets

COMPOSITE VIDEO SAMPLES (a)　　　　　(b)　　　　　(c)

| FIELD A | LINE | 0<br>6<br>⋮ | |
| --- | --- | --- | --- |
| FIELD B | | 3<br>9<br>⋮ | |
| FIELD C | | 8<br>6<br>⋮ | |
| FIELD A | LINE | 2<br>8<br>⋮ | |
| FIELD B | | 5<br>11<br>⋮ | |
| FIELD C | | 2<br>8<br>⋮ | |
| FIELD A | LINE | 4<br>10<br>⋮ | |
| FIELD B | | 1<br>7<br>⋮ | |
| FIELD C | | 4<br>10<br>⋮ | |

FIG. 8b

| MEM FIELD | ADD | TV FIELD # | | | | | | |
|---|---|---|---|---|---|---|---|---|
| | | 0 | 1 | 2 | 3 | 4 | 5 | 6 |
| | | LINE # | | | | | | |
| A1 | 0<br>1<br>2<br>3 | 0<br>6<br>12<br>18 | | | 3<br>9<br>15<br>21 | | | 0<br>6<br>12<br>18 |
| B1 | 85<br>86<br>87<br>88 | | 3<br>9<br>15<br>21 | | | 0<br>6<br>12<br>18 | | |
| C1 | 170<br>171<br>172<br>173 | | | 0<br>6<br>12<br>18 | | | 3<br>9<br>15<br>21 | |
| A2 | 0<br>1<br>2<br>3 | 2<br>8<br>14<br>20 | | | 5<br>11<br>17<br>23 | | | 2<br>8<br>14<br>20 |
| B2 | 85<br>86<br>87<br>88 | | 5<br>11<br>17<br>13 | | | 2<br>8<br>14<br>20 | | |
| C2 | 170<br>171<br>172<br>173 | | | 2<br>8<br>14<br>20 | | | 5<br>11<br>17<br>23 | |
| A3 | 0<br>1<br>2<br>3 | 4<br>10<br>16<br>22 | | | 1<br>7<br>13<br>19 | | | 4<br>10<br>16<br>22 |
| B3 | 85<br>86<br>87<br>88 | | 1<br>7<br>13<br>19 | | | 4<br>10<br>16<br>22 | | |
| C3 | 170<br>171<br>172<br>173 | | | 4<br>10<br>16<br>22 | | | 1<br>7<br>13<br>19 | |

FIG. 21

| LINE TO DISPLAY | LINE TO READ | FIELD BUFFER | ROW ADDRESS | ORDER OF LINES | SCANCNTR CODE | | | IOP |
|---|---|---|---|---|---|---|---|---|
| | | | | | MUX1 | MUX2 | MUX3 | |
| 1 | 1 | B3 | 85 | BOT | X | 10 | X | 0 |
| 2 | 1<br>2<br>3 | B3<br>A2<br>B1 | 85<br>0<br>85 | BOT<br>MID<br>TOP | 10 | 01 | 00 | 1 |
| 3 | 3 | B1 | 85 | TOP | X | 00 | X | 0 |
| 4 | 3<br>4<br>5 | B1<br>A3<br>B2 | 85<br>0<br>85 | TOP<br>BOT<br>MID | 00 | 10 | 01 | 1 |
| 5 | 5 | B2 | 85 | MID | X | 01 | X | 0 |
| 6 | 6 | B2<br>A1<br>B3 | 85<br>1<br>86 | MID<br>TOP<br>BOT | 01 | 00 | 10 | 1 |
| 7 | 7 | B3 | 86 | BOT | X | 10 | X | 0 |
| 8 | 7<br>8<br>9 | B3<br>A2<br>B1 | 86<br>1<br>86 | BOT<br>MID<br>TOP | 10 | 01 | 00 | 1 |

FIG. 22

| LINE # TO DISPLAY | LINES TO READ | BUFFER | ROW ADDRESS | ORDER OF LINES |
|---|---|---|---|---|
| 2 | 0 | A1 | 0 | 1 |
|   | 2 | A2 | 0 | 2 |
|   | 4 | A3 | 0 | 3 |
| 3 | 1 | B3 | 85 | 3 |
|   | 3 | B1 | 85 | 1 |
|   | 5 | B2 | 85 | 2 |
| 4 | 2 | A2 | 0 | 2 |
|   | 4 | A3 | 0 | 3 |
|   | 6 | A1 | 1 | 1 |
| 5 | 3 | B1 | 85 | 1 |
|   | 5 | B2 | 85 | 2 |
|   | 7 | B3 | 86 | 3 |
| 6 | 4 | A3 | 0 | 3 |
|   | 6 | A1 | 1 | 1 |
|   | 8 | A2 | 1 | 2 |
| 7 | 5 | B2 | 85 | 2 |
|   | 7 | B3 | 86 | 3 |
|   | 9 | B1 | 86 | 1 |
| 8 | 6 | A1 | 1 | 1 |
|   | 8 | A2 | 1 | 2 |
|   | 10 | A3 | 1 | 3 |
| 9 | 7 | B3 | 86 | 3 |
|   | 9 | B1 | 86 | 1 |
|   | 11 | B2 | 86 | 2 |

FIG. 23

| LINES TO DISPLAY | LINES TO READ | LINE REGISTERS | | | IDP |
|---|---|---|---|---|---|
| | | LM3 | LM2 | LM1 | |
| 3 | 1 3 5 | 3 | | | |
| 3 | 2 4 6 | 4 | 3 | | 0 |
| 4 | 3 5 7 | 5 | 4 | 3 | 1 |
| 5 | 4 6 8 | 6 | 5 | 4 | 0 |
| 6 | 5 7 9 | 7 | 6 | 5 | 1 |
| 7 | 6 8 10 | 8 | 7 | 6 | 0 |
| 8 | 7 9 11 | 9 | 8 | 7 | 1 |

TRIPLE FIELD BUFFER FOR TELEVISION IMAGE STORAGE AND VISUALIZATION ON RASTER GRAPHICS DISPLAY

FIELD OF THE INVENTION

This invention relates generally to the display of television images with a non-interlaced display terminal and, in particular, to a display system including a frame buffer and control apparatus therefor for providing access to digitized television color image data for accomplishing digital filtering, motion detection and correction and for accomplishing synchronization.

BACKGROUND OF THE INVENTION

A desirable feature in certain graphics systems, such as a multi-media workstation, is the display of an interlaced image, such as a color television image, with a non-interlaced graphics display screen. However, several problems must be overcome in order to provide this capability in a satisfactory manner.

A first problem relates to enhancing the quality of the television image. One known method for providing image enhancement involves a digital filtering or decoding technique, as depicted in FIG. 1a. However, this technique requires real-time access, relative to the incoming video, to a neighborhood (A) of pixels (B) that are located on three consecutive television lines of a video field.

A second problem is related to accomplishing motion-adaptive deinterlacing. As illustrated in FIG. 1b this technique requires an access to pixels (B) located on three television lines. Two of the three line belong to a current video field while the third line, shown as a dashed line, is associated with a previous video field. Additionally, all three of the lines must be synchronized with the image lines of the graphics display.

A third problem is related to achieving a full synchronization of the deinterlaced television image relative to the graphics image. Such synchronization implies that fully stored frames, each frame comprising two fields, of television video must be used for the visualization of the television image on the graphics screen.

Aspects of the second and third problems are further illustrated in FIGS. 1c and 1d. FIG. 1c shows a position of an object, represented by a vertical line, in two consecutive television fields when the object is moving in a horizontal direction. The first field is depicted in FIGS. 1c(a) while the second, consecutive field is depicted in FIG. 1c(b). It can be seen that due to the horizontal offset between the object image in the two fields that if all lines of both television fields are displayed simultaneously on a graphics screen, as depicted in FIG. 1c(c), the image of the object is blurred.

FIG. 1d illustrates the case, for the same moving vertical object, when the graphics screen is not synchronized with incoming television video. As a result, if a new field is partially written into a frame buffer that contains a previous field the image of the moving object is split. FIG. 1d(c) illustrates a combined effect of deinterlacing and image splitting. As can be seen the net result is a blurring of the television image when displayed upon the non-interlaced graphics display screen.

In U.S. Pat. No. 4,694,325, issued Sep. 15, 1987, S. Mehrgardt discloses an interface circuit for interfacing a color television receiver to a home computer wherein the home computer has a graphics clock signal unsynchronized with that of the television receiver. The circuitry of Mehrgardt includes a digital delay line having cascaded delay stages. However Mehrgardt is concerned only with already decoded Red, Green and Blue signals and not with the reception and subsequent display of a composite signal.

In U.S. Pat. No. 4,344,075, issued Aug. 10, 1982, J. Rudy discloses a system for eliminating ragged vertical edges displayed by a NTSC color carrier on a non-interlaced display. Rudy discloses timing control circuitry that is operative only during a selected single scan line of a non-display portion of each successive field of a given non-interlaced television raster scan-line pattern (col. 2, lines 45–61).

In U.S. Pat. No. 4,698,674, issued Oct. 6, 1987, L. Bloom discloses a data converter for converting sequentially digitized interlaced data, from a television camera or other data source, to non-interlaced data for storage in a computer memory. The approach of Bloom is to store two fields of the image in a memory. Bloom apparently assumes that the fields of the television image are synchronized (gen-locked) with the frames of the graphics screen. However, in practically all applications this is not the case. Instead, the timing of a non-interlaced graphics controller is typically totally independent from a television video source.

Other references of general interest include the following. In U.S. Pat. No. 3,970,776, Jul. 20, 1976 K. Kinuhata et al. disclose a system for converting the number of lines of a television signal having interlaced frames, each frame formed by two adjacent interlaced fields. In U.S. Pat. No. 4,484,188, issued Nov. 20, 1984 G. Ott discloses video signal generation circuitry for improving the resolution of a video signal by forming additional video scan lines between successive scan lines. The system of Ott forms the additional video scan line by combining video attributes of adjacent scan lines In U.S. Pat. No. 4,480,267, issued Oct. 30, 1984, P. van den Avoort et al. disclose field interpolation for obtaining substantially equal amplitudes of information from each of two successive fields of a television signal. van den Avoort is concerned with a conversion from a 313-line television picture to a 625-line television picture. In U.S. Pat. No. 4,694,348, issued Sep. 15, 1987, K. Kamiya et al. disclose a scan interlace converter for a liquid crystal display panel of a television receiver. In U.S. Pat. No. 4,660,070, issued Apr. 21, 1987, Nishi et al. disclose a video display processor for writing video image data into a video memory. The video display processor generates memory address data in accordance with horizontal and vertical synchronization signals. In U.S. Pat. No. 4,518,984, issued May 21, 1985 H. Mitschke discloses circuitry including a video frame store 221 for obtaining a flicker-free image when producing a combined text and graphics (Videotext) display.

However, none of the forgoing U.S. Patents either singularly or in combination teach a method or apparatus that overcomes in a satisfactory manner all of the above described problems relating to image quality enhancement, motion-adaptive deinterlacing and synchronization when displaying an interlaced image, such as a television signal, with a non-interlaced graphics display system.

It is thus an object of the invention to provide method and apparatus for displaying an interlaced image signal on a non-interlaced graphics display screen.

It is a further object of the invention to provide method and apparatus for displaying on a non-interlaced graphics display screen a television color image frame comprised of two interlaced fields; the invention providing three field buffers, two for storing the two fields of a completed frame while the third field buffer stores a current television field.

SUMMARY OF THE INVENTION

The foregoing problems are overcome and the objects of the invention are realized by a method and apparatus for displaying, with a non-interlaced display system, an image signal expressive of an interlaced image. The interlaced image may be provided by a composite color television signal that provides a plurality of separately provided image fields. In accordance with a method of the invention there are disclosed the steps of (a) storing in a first memory a first image field; (b) storing in a second memory a second image field; (c) reading the first and the second memories; (d) simultaneously displaying on a display screen the first and the second image fields as a single image frame; and (e) while performing the step of reading the method includes a step of storing in a third memory a third image field. For image fields numbered 1, 2, 3, 4, 5 ... n .. the system of the invention reads the image fields two at a time in accordance with a predetermined sequence given by: 1 and 2, 2 and 3, 3 and 4, 4 and 5, ... (n−1) and n, n and (n+1).

For a case where the image frame is selected to have a longer duration than an image field the invention detects a relationship between the image frame and the image field and alters the predetermined display sequence such that the image fields are displayed in a sequence given by: (n−2) and (n−1), (n−1) and n, and (n+1) and (n+2).

For a case where the image frame is selected to have a shorter duration than an image field the invention alters the predetermined sequence such that the image fields are displayed in a sequence given by: (n−2) and (n−1), (n−2) and (n−1), and (n+1) and (n+2).

A frame buffer of the invention has a 3×3, a 4×3 or an 8×3 arrangement of memory blocks, each of the blocks storing a portion of a television field. The frame buffer is read out such that, for example, a 3×3 neighborhood of pixels are provided in parallel for display or for subsequent pre-display processing such as interpolation.

BRIEF DESCRIPTION OF THE DRAWING

The above set forth and other features of the invention are made more apparent in the ensuing Detailed Description of the Invention when read in conjunction with the attached Drawing, wherein:

FIG. 8b illustrates the storage sequence of FIG. 8a in greater detail;

FIGS. 21, 22 and 23 are tables illustrating, for the different embodiments of the invention, various aspects of the operation of reading sequences of lines from the frame buffer for display.

DETAILED DESCRIPTION OF PREFERRED EMBODIMENTS OF THE INVENTION

Figure 2:
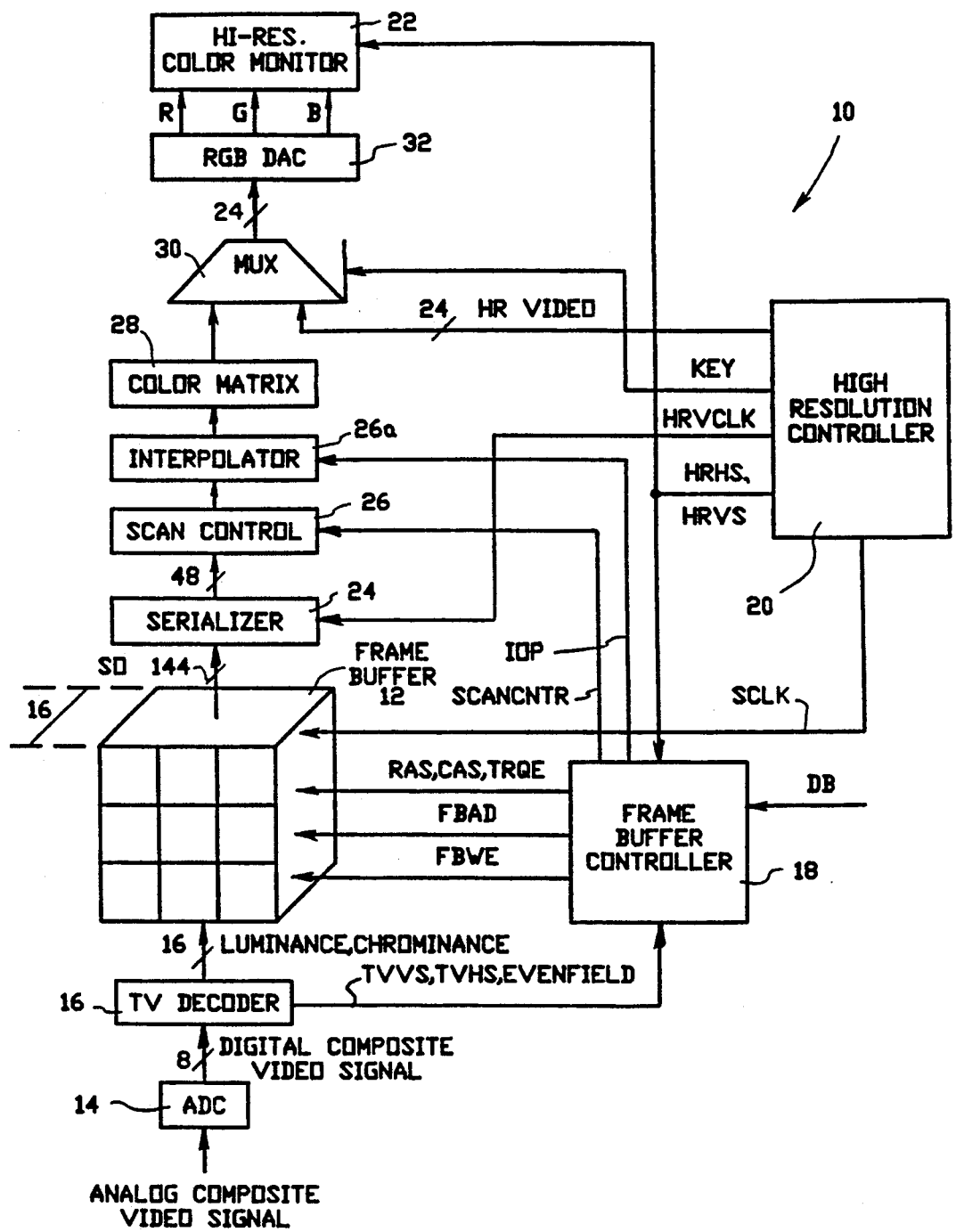
FIG. 2 shows in block diagram form one embodiment of the the invention having a television decoder serially positioned before a frame buffer and an interpolator positioned after the frame buffer.
Figure 3:
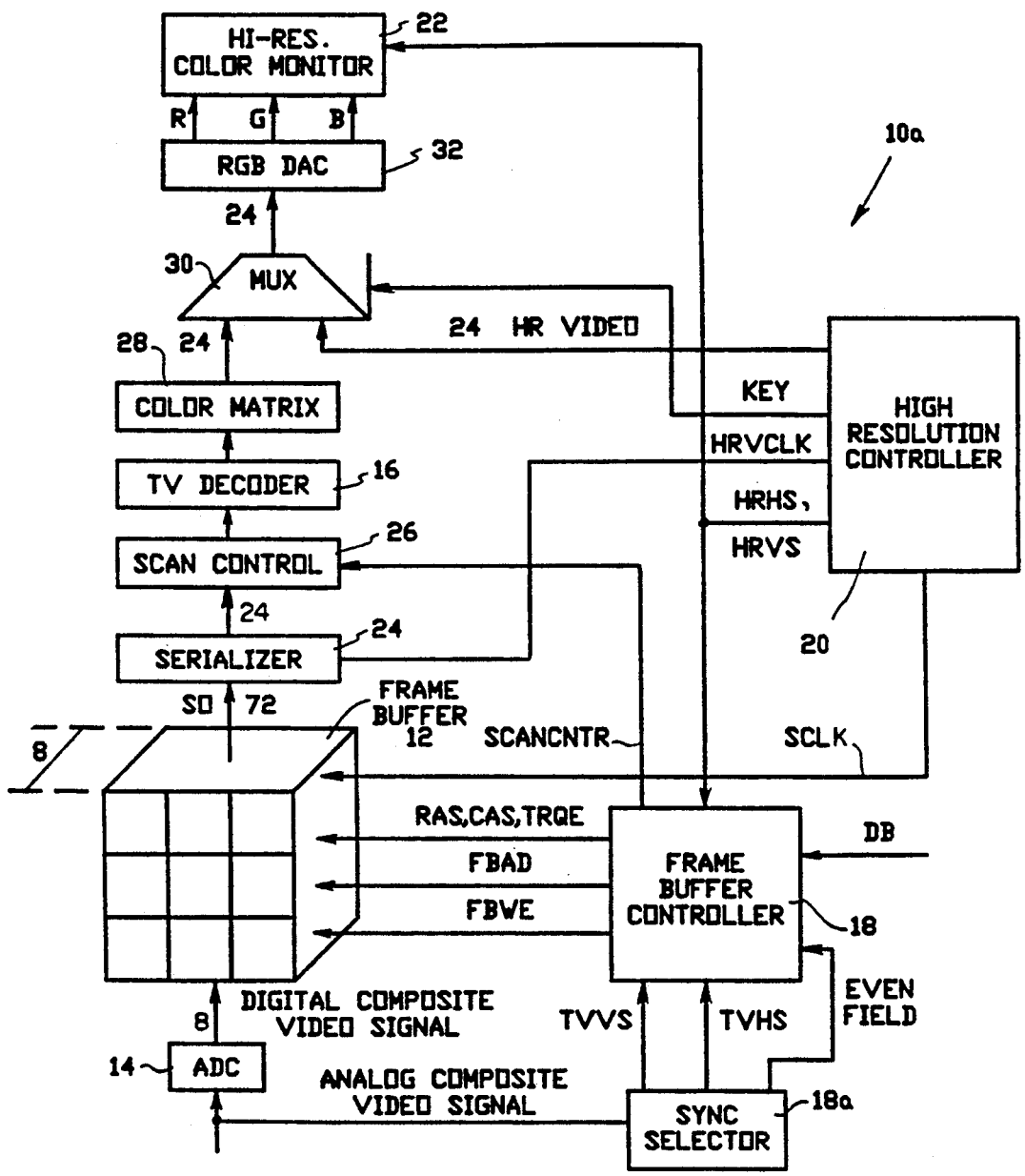
FIG. 3 shows in block diagram form another embodiment of the invention having the television decoder serially positioned after the frame buffer.
Figure 4:
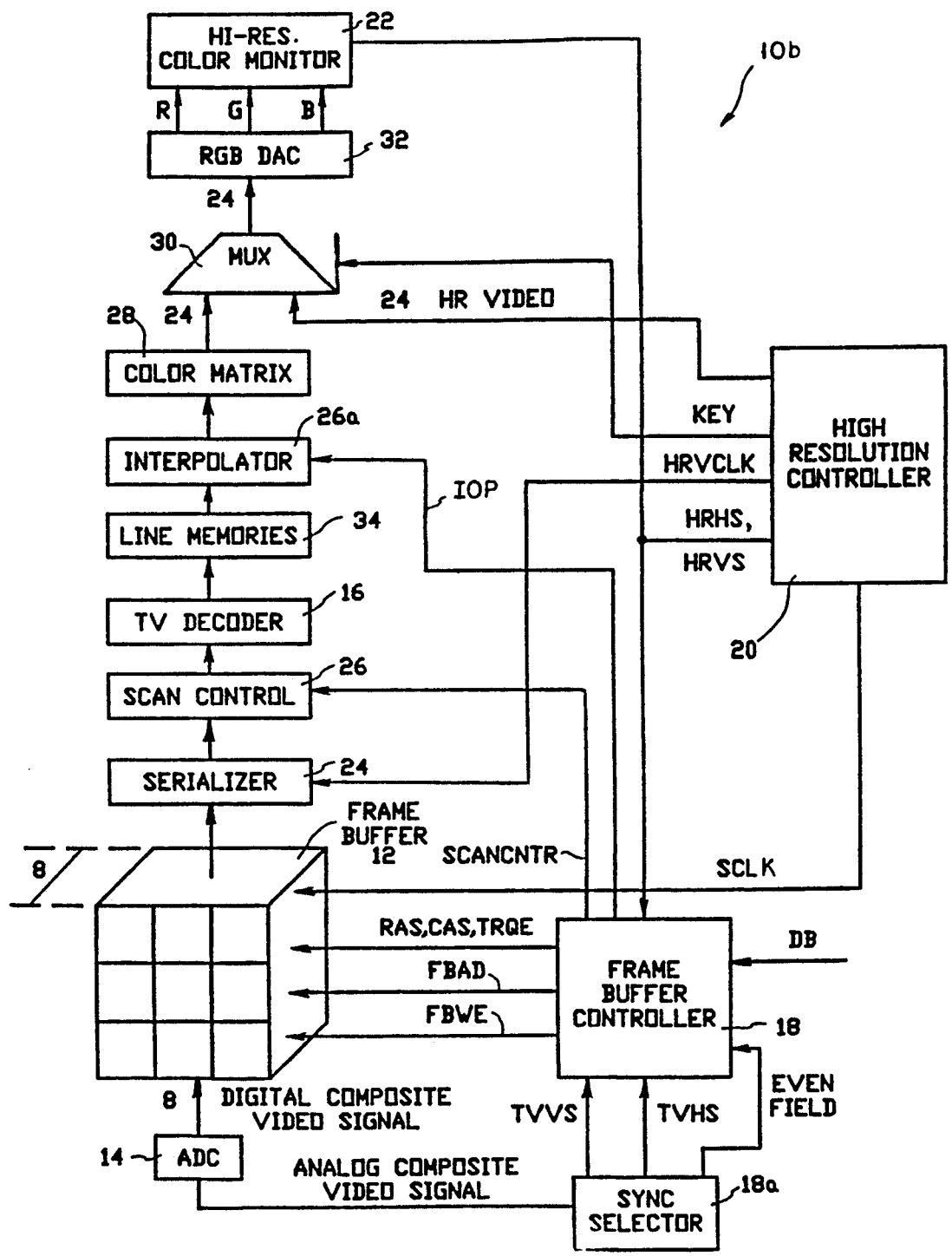
FIG. 4 shows in block diagram form another embodiment of the invention having the television decoder and the interpolator serially positioned after the frame buffer.

FIGS. 2, 3 and 4 illustrate in block diagram form three presently preferred embodiments of the invention. The embodiment shown in FIG. 2 illustrates a system 10 that stores component digital video within a frame buffer 12 that is 16 bits in depth. The system 10 also includes an interpolator and solves two of the previously described problems, namely motion artifact elimination and full synchronization of television and graphics images. Although requiring more memory to store the television image than do the other embodiments of the invention the embodiment of FIG. 2 provides a full solution for systems using component video representation such as production HDTV standards (SMPTE 240M standard) or Super-VHS systems having higher quality than NTSC. It is noted that there is no need for a television decoder for systems such as HDTV or Super-VHS that employ chrominance/luminance analog component inputs. In this case, a TV decoder is not needed although an additional Analog-to-Digital Converter (ADC) is required to digitize luminance and chrominance components.

Discussing now the embodiment of FIG. 2 in greater detail an Input Analog Composite Video Signal from a television signal source is applied to ADC 14. ADC 14 provides a Digital Composite Video Signal. An eight bit resolution ADC 14 output has been found to provide adequate picture quality. The Digital Composite Video Signal is applied to a conventional television decoder 16 that provides a digital luminance (Y) output, a digital chrominance (C) output, a television vertical sync (TVVS) signal, a television horizontal sync (TVHS) signal, and a television field indicator signal EVENFIELD.

Suitable devices for providing converter 14 and decoder 16 functions, except EVENFIELD generation, are manufactured by the Philips Corporation as device part numbers TDA8708 and SAA9051. These devices are described in "Digital Video Signal Processing" Philips Components Manual No. 9398 063 30011. It should be noted that both 12 bit and 16 bit devices are available for use and that these and other devices are available that correspond to the CCIR 601-1 recommendation for digital television encoding and transmission as set forth in "Handbook of Recommended Standards and Procedures, International Teleproduction Society", 1987, p. 62. The generation of the EVENFIELD signal is described below.

The luminance and chrominance signals are each expressed with eight bit resolution and are provided to the frame buffer 12 for storage. The TVVS, TVHS and EVENFIELD signals are provided to a frame buffer controller 18 where these signals are employed in a manner which will be discussed.

Frame buffer controller 18 generates a plurality of video RAM (VRAM) control signals, including row address strobes (RAS), a column address strobe (CAS), a transfer/output enable signal TR/QE, a frame buffer address (FBAD), and a frame buffer write enable (FBWE). The controller 18 hardware set-up data is loaded from a host computer data bus (DB). The frame buffer control signals are generated and used in a manner described in the selected VRAM specification. For example, one suitable type of device is manufactured by Toshiba and is known as a TC24256 1 Mbit VRAM. Although frame buffer 12 is preferably comprised of VRAM devices the use of VRAMs is not essential. The same result can be achieved using conventional dynamic RAM (DRAM) devices but with a requirement for more memory chips in order to provide the required memory bandwidth at the output of the frame buffer 12.

Controller 20 generates a high resolution graphics image (HR VIDEO) signal. Controller 20 also provides timing functions for a high resolution color monitor 22, such as a high resolution vertical sync (HRVS) signal and a high resolution horizontal sync (HRVS) signal. The HRVS and HRHS signals are also used as inputs to the frame buffer controller 18. The controller 20 generates a serial clock SCLK for shifting data from the serial port of the VRAMs and a high resolution video clock HRVCLK for shifting data from a serializer 24. HRVCLK corresponds to the overall number of pixels on a horizontal line of the high resolution color monitor 22. SCLK is derived by dividing HRVCLK by three. The high resolution color monitor 22 has a pixel resolution of, for example, 1024×1024 displayable pixels.

Figure 1A:
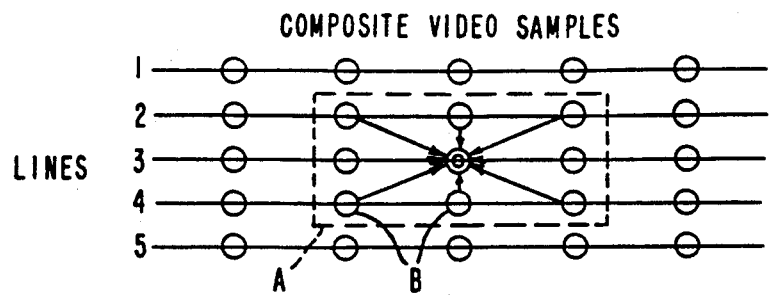
FIG. 1a illustrates a conventional digital filtering or decoding scheme that operates on a neighborhood of image pixels selected from three consecutive scan lines.
Figure 1B:
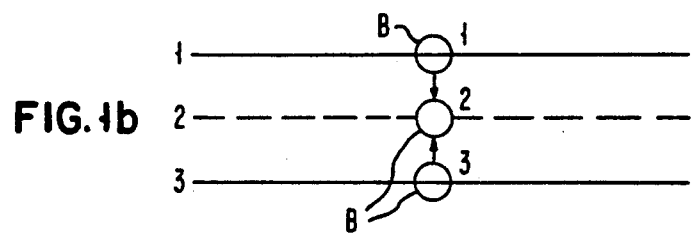
FIG. 1b illustrates a technique for achieving motion-adaptive deinterlacing.
Figure 1C:
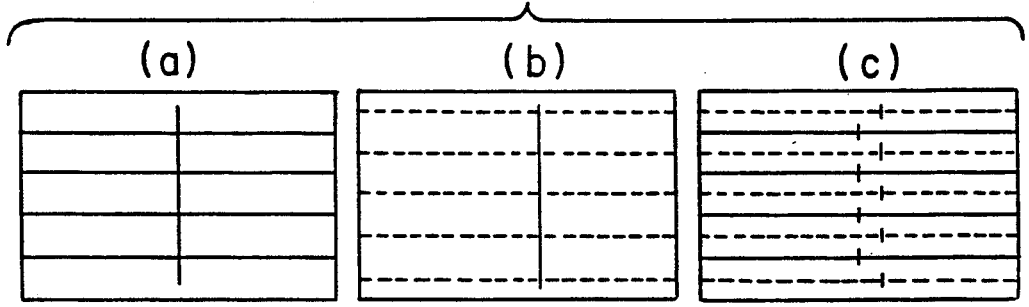
FIGS. 1c and 1d illustrate a deinterlacing effect and a deinterlacing effect with split screen, respectively, when displaying with a prior art system a linear, vertically disposed object that is moving in a horizontal direction.
Figure 1D:
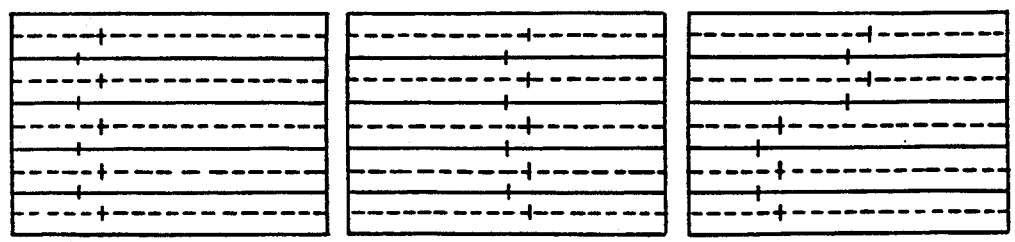

With each SCLK, the output of the frame buffer 12 provides to the serializer 24 nine 16 bit pixels for a total of 144 bits. The nine pixels represent a 3×3 pixel neighborhood comprised of 144 bits as shown in FIG. 1a. In other words, the frame buffer 12 delivers three sampled television lines by three pixels to the serializer 24 at a serial clock time, although only one line will be shown finally on the display screen of monitor 22. The serializer 24 thus converts the parallel output of the frame buffer 12 to a sequential pixel data stream to eventually be displayed pixel-by-pixel on the display screen.

Traditionally, a serializer is employed to serially shift only one line of data read in parallel from a frame buffer. However, in accordance with the invention three lines are read in parallel from the frame buffer 12. Hence, during each HRVCLK period, the serializer 24 output shifts out three vertically adjacent pixels (48 bits) to the scan control device 26.

As a consequence of a "three by three" block memory organization described in detail below the three lines at the output of the serializer 24 are not necessarily consecutive video lines. Moreover, their order is variable and depends on the particular addresses of the frame buffer where the lines are located. The scan control device 26 rearranges the output of the serializer 24 in a manner described in detail below, providing a required line order arrangement to the input of the interpolator 26a.

If motion correction processing is not employed then the output of the scan control device 26 may be coupled directly to a color matrix 28. Furthermore, this simplest case does not require access to three television lines in parallel. However, the three by three frame buffer organization is still employed to achieve proper synchronization between an incoming television image and the displayed graphics image.

If motion detection and correction is employed, as illustrated in FIG. 2, then the interpolator 26a is installed as shown between the scan control 26 and the color matrix 28. A suitable interpolator architecture and operational description is found in the literature, such as in an article "Improved Definition Television" by Leonard Feldman, Radioelectronics Magazine, January 1989, p. 43.

It should be noted that the system described by Feldman cannot be used when two independent video sources are to be shown on the same screen. The interpolator requires access to three television lines simultaneously, two of which belong to a current television field and one of which belongs to a previous field. The source assumes that the television line rate is simply doubled on the output, i.e. the video output is a direct function of the video input. For this case, the current field is always present on the inputs of the system, and the previous field is stored. Using one more line delay, the necessary three lines become available at the input of the interpolator. However, as was previously stated a high resolution image is typically absolutely independent of a second image source, and the current video field is asynchronous with the frame buffer output. The present invention overcomes this problem by always providing the required data to the input of the interpolator 26a.

As was stated the interpolator 26a provides an input signal to the color matrix 28. The color matrix 28 converts, in accordance with an applicable standard such as CCIR 601, an eight bit luminance signal and an eight bit chrominance signal to eight bit red, eight bit blue and eight bit green signals. The color primary signals serve as an input to multiplexer 30. A second input to the multiplexer 30 is the HR VIDEO signal comprised of 24 bit primary colors from the controller 20.

Selection of the high resolution television image or the HR VIDEO signal for display on the screen of the high resolution color monitor 22 is controlled by a KEY signal output of the controller 20. The KEY signal may be provided on a pixel basis, by decoding one of the graphic pixel data values, or decoding a so-called "window identification number" that identifies where the television image is intended to be shown through a graphics window. In the latter case, the graphics image pixel data has a special field, called "window-ID". In the former case one of the colors is not displayed on the screen. Instead, the video image sample passes through to that pixel location on the screen. For example, through the use of multiplexer 30 a television image may be displayed in conjunction with text and/or graphical information provided as the HR VIDEO signal.

The 24 bit output of the multiplexer 30 is provided to an RGB Digital-to-Analog Converter (DAC) 32 which in turn provides in a conventional manner R, G, B analog signals for driving the high resolution color monitor 22.

The embodiment shown in FIG. 3 illustrates a system 10a that is similar to the system 10 of FIG. 2. However, the system 10a stores a digital composite signal and, as a result, includes a frame buffer 12 that is eight bits in depth. Furthermore, the system 10a does not include the interpolator 26a. Consequently this embodiment solves only the aforementioned synchronization problem. It is noted that unlike the system of FIG. 2 the system 10a has the television decoder 16 provided in the data path after the frame buffer 12. As a result, while the system 10 of FIG. 2 requires a TV decoder 16 that operates at the sampling clock rate, such as 13.5 Mhz according to CCIR 01, the system of FIG. 3 requires a TV decoder 16 that operates at the high resolution video clock rate, which is significantly higher than the sampling clock rate. For example, the high resolution video clock rate is 25 Mhz for 640×480 resolution and 110 Mhz for 1280×1024 resolution. A suitable high frequency TV decoder can be constructed by employing Application Specific Integrated Circuits (ASIC) technology.

The system 10b of FIG. 4 provides a complete solution to all of the problems previously described. The system 10b incorporates a plurality of line memories 34 and an interpolator 26a, in addition to the architecture shown in FIG. 3 that stores a digital composite signal in a frame buffer 12 that is eight bits in depth. The embodiment of FIG. 4 is especially useful for a television studio environment based on digital composite NTSC. Such an environment processes the digital composite video that is output directly from widely used so called D2-type digital tape recorders. Such recorders store video as an eight bit composite digital representation of composite analog video, sampled with a frequency four times higher than the color burst frequency, i.e. 14.32 Mhz. If digital composite video is stored directly in the frame buffer 12, for the purpose of further editing or image exchange between remote workstations, the ADC 14 shown in FIG. 4 is not required.

For the case where a television image is stored as an eight bit composite signal and is decoded after the frame buffer 12, as shown in FIGS. 3 and 4, the TV decoder 16 is positioned between the scan control 26 and the color matrix 28 and the television synchronization signals TVVS and TVHS are derived from the analog composite signals by a conventional synchronization selector or Sync Decoder 18a. Suitable devices are commercially available from several television component manufacturers.

The decoding process employed by the system 10a shown in FIG. 3 requires two or three lines of current field data to be accessed in parallel. The present invention provides for the use of either decoding scheme. For example, if a three line decoding scheme is used as described in an article "High picture quality digital TV for NTSC and PAL systems" by S. Suzuki et al. in IEEE Transactions on Consumer Electronics, Vol. CE-30, No. 3, August 1984, p. 213-219. Using this technique the lines are read from a television field stored in the frame buffer 12 and are supplied to the serializer 24. The lines are put in correspondent order by the scan control 26 and are sent to the TV decoder 16 input. It is noted the serializer 24 has a 72 bit input and a 24 bit output, or one half of the signal lines required by the embodiment of FIG. 2.

For the more complex case shown in FIG. 4, where both motion correction and television signal decoding schemes are employed, it is necessary to provide simultaneous access to the three lines of the current field and one line of the previous field. However, the three by three frame buffer 12 memory organization does not provide ready access to four lines of video information. Such access can be provided by interleaving write and read cycles of the VRAM primary port, using write cycles to store sampled data and read cycles to provide an access to the nine pixels in three consecutive lines, and then feeding the result directly to the serializer for further processing. However, this approach requires a complex read/write controller 18, and does not exploit the advantage of using the VRAM secondary port.

The presently preferred embodiment of FIG. 4 instead employs a simpler technique for accessing three video lines by providing the line memories 34 in a manner described below.

Figure 5:
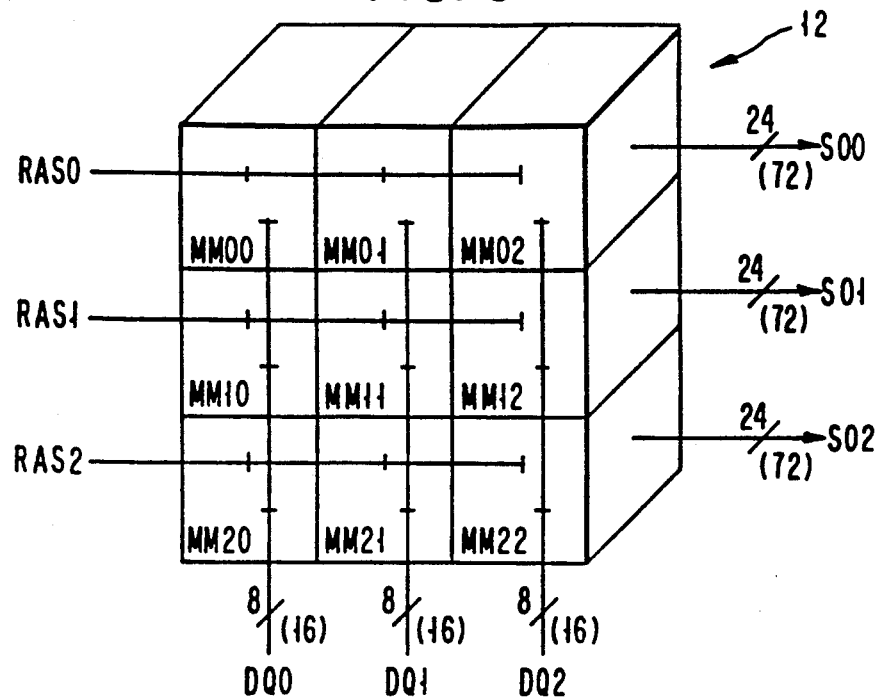
FIG. 5 illustrates a presently preferred 3 by 3 memory block organization of the frame buffer.

Various aspects of the three presently preferred embodiments of FIGS. 3, 4 and 5 are now described in greater detail.

As can be seen in FIG. 5 the frame buffer 12 is organized as a 3×3 matrix of nine memory blocks or modules MM00 through MM22. Memory modules MM00, MM01 and MM02 are controlled by signal RAS0, MM10, MM11 and MM12 are controlled by RAS1 and MM20, MM21 and MM22 are controlled by RAS2. Primary port data terminals of MM00, MM10 and MM20 are connected, providing a 16 bit (FIG. 2) or an eight bit (FIGS. 3 and 4) wide DQ0 data bus. In the same manner the MM01, MM11 and MM21 primary data terminals are connected to provide a data bus DQ1 and the MM02, MM12 and MM22 primary data terminals provide a data bus DQ2.

The frame buffer memory address FBAD, WE and other memory control signals are connected in common to all memory modules, but are not shown in FIG. 5 to simplify the drawing.

The serial outputs of the memory modules MM00, MM01 and MM02 are combined in a serial output bus S00. The serial output bus S01 represents the serial outputs of MM10, MM11 and MM12 and serial bus S02 represents the serial outputs of MM20, MM21 and MM22.

Figure 6:
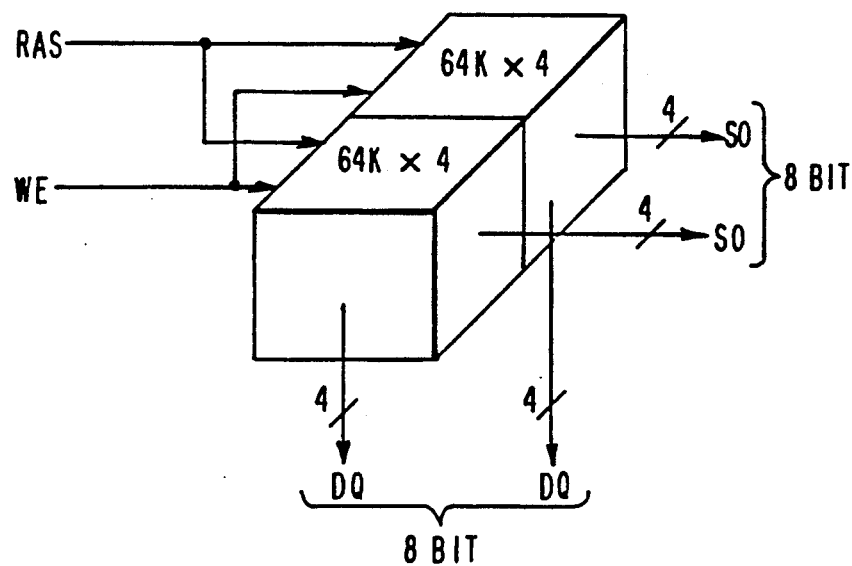
FIG. 6 illustrates in greater detail one embodiment of a frame buffer memory block.

The storage capacity of an individual memory module varies from implementation to implementation as a function of whether a digital composite signal or a digital component signal is stored, and also as a function of the television standard in use. For example, and referring to FIG. 6, to store a digital composite NTSC signal, which has a relatively low resolution, the memory module may include two 256 Kbit memory devices, each organized as 64K words by four bits, i.e. as 256 by 256 words by four bits. As a result, a memory module may be considered as a 256 by 256 by eight bit memory device having eight primary port data terminals (DQ), eight serial output pins (SO), and common control signals.

Figures 7, 8A:
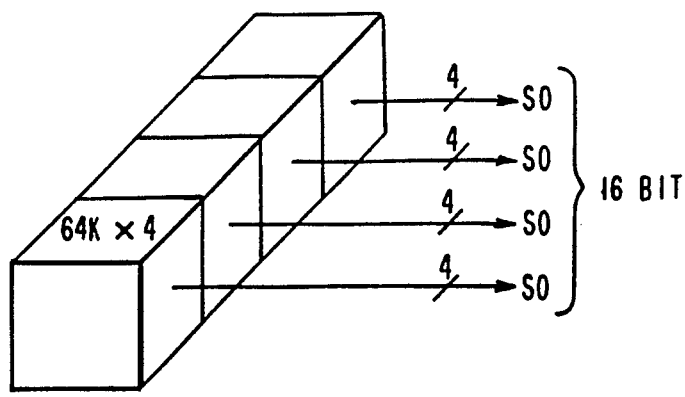
FIG. 7 illustrates in greater detail another embodiment of a frame buffer memory block.
FIG. 8a illustrates a preferred frame buffer video line storage sequence.

A memory block suitable for storing digital component NTSC signals is shown in FIG. 7. Four 64K by four bit memory devices are combined to provide a 16 bit sample storage. Hence, referring again to FIG. 5, data buses DQ0, DQ1 and DQ2 have eight bits when using eight bit digital composite signals and 16 bits when using component 16 bit signals. Accordingly, the serial data buses (S00-S02) have 24 or 72 wires to accommodate in a parallel manner all memory device serial data outputs.

Incoming sampled television lines are stored in the frame buffer 12 in accordance with the organization depicted in FIG. 8. The total amount of frame buffer 12 memory space required for storing three television fields is referred to in FIG. 8 as Memory Fields A, B and C. Each memory field is stored within all memory devices, consuming one third of the memory space in each of the memory rows (e.g. MM00, MM01 and MM02). It can be seen that the frame buffer 12 stores the television lines in a specific order with each memory block taking part in storing three video fields. As such, and assuming that the even field is received first, the lines 0, 2 and 4 of the first incoming field are loaded in the upper, middle and bottom memory blocks in the memory row address location 0. Subsequently, lines 6, 8 and 10 of the first incoming field are stored in the same order, but using the memory row address 1. The incoming lines are stored in this manner until the entire first incoming field is stored. Considering that an NTSC field has approximately 240 active lines, only 80 rows of memory are required for storing one complete field in each memory device, while 56 rows are available overall. The total amount of frame buffer 12 memory space required to store the first incoming field (A) consumes the memory space referred to as FIELD A. For this example FIELD A requires 240 rows of storage equally divided over the three memory blocks.

The second incoming video field consumes the memory space referred to in FIG. 8 as FIELD B. The second field is stored within the frame buffer 12 with an address shift or offset equal to 85, but in a slightly different order beginning with the third row of memory devices.

The third incoming field consumes the memory space referred on FIG. 8 as Field C. It is stored with an address offset equal to 170, but again starting from the first row of memory devices.

In accordance with the invention after the first two incoming fields (A and B) are fully stored they are read out in parallel and displayed as a first high resolution frame image. A detailed distribution of incoming television lines and frame buffer row addresses is shown in FIG. 8b. Memory field A is stored in all three memory device rows. The first memory device row stores a portion A1 of memory field A, the second row stores A2 and the third row stores A3. Memory fields B and C are distributed accordingly. As can be seen in the timing diagram of FIG. 9 after the sampling and storage of six television fields occurs the addressing sequence repeats.

It is noted that the NTSC case requires 240 row locations of storage in that NTSC has approximately 480 active lines per frame, or 240 active lines per field. Thus, for a 256 by 256 memory organization only 80 rows of memory of each device are used, leaving sufficient unused storage space for the next two fields. It is further noted that approximately 15 per cent of a television frame is typically not displayed on a TV receiver because of so called frame "over-scan". Thus, a television camera provides a wider and a taller image than that usually shown on the television monitor. As a result, a fewer number of lines can be sampled. Furthermore, the total number of sampled lines per field is a function of number of lines to be shown on the monitor 22, that is, on the desired mapping of the television image to the graphics screen.

For the PAL television standard employed primarily in Europe and having more than 512 active lines per frame full storage can be utilized, meaning that if 255 lines are sampled approximately 15 percent of the active lines are skipped. However, this is not significant in that normally 15 percent of the image is not required for display as in the NTSC case. Of course, if all lines of a PAL image are required to be sampled and stored then larger memory devices can be employed, e.g. with an organization of 512 by 512.

At present there are several proposals for defining a HDTV format. A simplest approach is to double the number of lines. Thus, for the NTSC case the proposal is to have 1050 scan lines per frame instead of 525 and for the PAL case to have 1250 scan lines per frame. An intermediate approach is to have 1125 lines per frame, with 1035 active lines. For all these proposed standards the use of memory devices with 512 by 512 organization is sufficient to sample a required number of lines. In that displays with horizontal resolution up to 1536 pixels cannot show full HDTV resolution, the 3 by 3 approach to memory organization discussed above is applicable using memory devices organized as 512 by 512. Only in the case of a very high resolution display, such as a display having 2048 horizontal pixels, does it appear advantageous to fully sample HDTV lines in the frame buffer 12. For this case a frame buffer 12 memory row includes four memory modules and requires 25 percent more memory devices, providing a 4 by 3 frame buffer 12 embodiment instead of the 3 by 3 implementation previously described. For this approach the teaching of the invention is still fully applicable and is modified so that three horizontally adjacent pixels out of the four available from the serializer 24 are used at one time. For this case 12 pixels are collected and then processed in four cycles while the next 12 pixels are read from the frame buffer 12 in three clock cycles.

A further embodiment is the use of an 8 by 3 frame buffer organization which may be required to provide very high resolution display such as 2048 by 1536 at a 60

Hz non-interlaced scan and with a corresponding 260 Mhz video pixel clock with sufficient video refresh bandwidth. Current VRAM technology has a 35 or 40 Mhz serial clock limit therefore requiring eight memory devices for a frame buffer 12 memory row. This 8 by 3 architecture is also fully compatible with the teaching of the invention.

For simplicity further discussion is made only for the NTSC case, it being realized that the teaching of the invention is also applicable to the PAL standard and to other standards.

As can be realized, a problem is presented in that the high resolution graphics frame and a television field do not typically have the same duration or period. Furthermore, there is a finite limit to the precision with which the duration of the frame can be specified. Moreover, although the high resolution frame duration and accuracy is specifiable by the manufacturer of the high resolution display apparatus and can be changed according to the system requirements, the television sync parameters are prescribed by the television standard in effect where the apparatus is used. Thus, timing incompatibilities between the graphics display apparatus and the incoming television video fields will adversely effect the quality of the displayed television image on the high resolution graphics screen.

The invention overcomes such problems relating to timing incompatibilities by selecting the period of the high resolution video frame to be slightly greater than a longest television field period or, alternatively, less than a shortest television field period, as specified by the applicable television standard. For example, if the television standard requires a field frequency of 60 Hz plus or minus 1%, the graphics display frame frequency is selected to be higher than 60.6 Hz or lower than 59.4 Hz.

Figure 9:
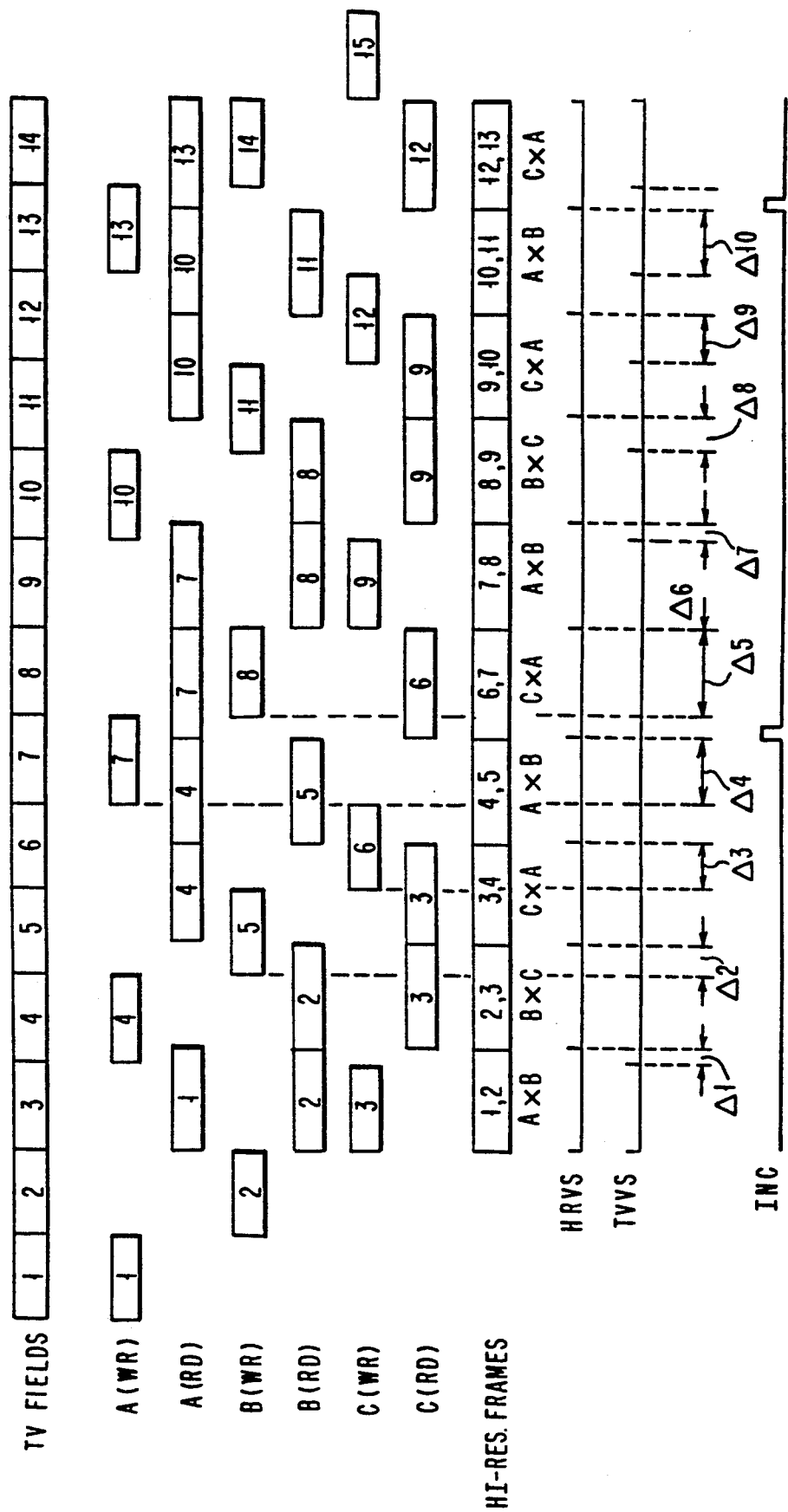
FIG. 9 is a timing diagram that illustrates the operation of the display system of the invention for a plurality of consecutively displayed high resolution frames.

This aspect of the invention is illustrated by the timing diagram on FIG. 9, where the case of a graphics frame having a longer duration than that of a television field is shown. As was previously described, the process of high resolution graphics video refresh requires two stored television fields with one of the currently displayed fields having been displayed during the previous graphics frame.

The first line of FIG. 9 shows a time sequence of television fields, numbered sequentially from the beginning of the sampling process. The line A(WR) illustrates when memory field A stores sampled data and corresponds to the incoming fields 1, 4, 7 etc.. The line A(RD) shows when field A provides data to the output of the display. The next four lines illustrate the in/out sequence for frame buffer 12 memory fields B and C. The line labeled HI-RES FRAMES illustrates a sequence of pairs of television fields, read from memory fields A, B and C and combined to form the high resolution frames displayed by monitor 22. For example, the first two television fields 1 and 2 are read from memory fields A and B, providing the first high resolution frame image for display on monitor 22. The next two television fields 2 and 3 are read from memory fields B and C and combined on the screen into the second high resolution frame, etc. The high resolution HRVS and television TVVS vertical sync pulses are also shown. It can be seen that the television vertical field period is shorter than the high resolution frame period. Furthermore it can be seen that each sampling period, A(WR) and B(WR), is located between two TVVS pulses and each reading period, A(RD) and B(RD), is located between two HRVS pulses.

In accordance with an aspect of the invention the sequence of reading frame buffer 12 memory fields is a function of a phase difference (delta) between HRVS and TVVS. For simplicity the sampling process starts when the phase difference delta between the HRVS and TVVS signals is approximately zero. Delta gradually increases and then falls again to approximately a zero value.

Thus, FIG. 9 shows that the television field reading sequence is (1,2), (2,3), (3,4), (4,5), where a subsequently displayed field is reused as a currently displayed field, followed by the pair (6,7). The point in time where the reading sequence is altered is determined based upon a measurement of delta, that is, the time difference between TVVS and HRVS. As will be shown, when delta becomes approximately equal to the television field period the sequence of reading memory fields is altered.

It is seen from FIG. 9 that the memory field sampling process typically overwrites one of the previously sampled and stored fields with a new field before the stored field is completely read to the screen. When the value of delta approaches approximately the television field period both new fields are read from the frame buffer 12. This provides a "jump" in time, insuring that by the end of the television field storage into a memory field that the previously stored television field data has been completely read out. The circuitry that measures delta provides a signal INC when the value of delta becomes critical. The INC signal interrupts the order of frame buffer read (or video refresh) addresses and causes a frame buffer 12 video-refresh address counter to increment. As seen in FIG. 9 delta gradually increases until (delta 4) generates an INC signal. Two new fields (6 and 7) are then read from the frame buffer 12 to the display output instead of one new field and one "old" field (5 and 6). Although the value of delta continues to increase it eventually falls to approximately zero and thereafter begins to increase again. When delta once more reaches the critical value another INC signal is generated, causing the field pair (12,13) to be displayed instead of (11,12).

The display process as described above is repeated to a point in time when it is determined that one of the television fields cannot be read fully because the associated frame buffer 12 FIELD A, B or C is required for storing a next incoming television field. Thus, and employing the example given in FIG. 9, after reading and displaying television fields 4 and 5, both new fields 6 and 7 are read and displayed, then fields 7 and 8, 8 and 9, 9 and 10, 10 and 11 and finally again both new fields 12 and 13.

The frame buffer controller 18 implements the change in the field order for the field storage reading process by determining delta between the high resolution graphics vertical sync pulse HRVS and television vertical sync pulse TVVS. When this delta becomes less than some minimum overlapping time of the television and graphics frame it indicates that if the television field reading sequence is not modified to obtain two new fields that a currently displayed field, if displayed again during a next high resolution graphics frame display period, will be required for storing a new incoming television field before the end of the graphics frame display period. If the associated FIELD were to be reused during this period undesirable flicker and/or other display anomalies would occur.

For the case when the graphics frame period is less than the television field period the same basic procedure is employed but, instead of displaying two new fields, two previously displayed fields are displayed. For example, the television display sequence may be fields 1 and 2, 2 and 3, 3 and 4, 3 and 4, and 6 and 7. As a result, one of television fields (5) is skipped. This approach may cause an artifact of flickering. However, if the difference between the television field period and graphics frame period is sufficiently small, such as 1%, only approximately one in one hundred frames is skipped. As a result, the visual effect of the flicker is insignificant.

Restating the foregoing teaching, for image fields numbered 1, 2, 3, 4, 5 ... n ... the system of the invention reads the image fields two at a time in accordance with a predetermined sequence given by: 1 and 2, 2 and 3, 3 and 4, 4 and 5, ... (n−1) and n, n and (n+1). For a case where the image frame is selected to have a longer duration than an image field the invention detects a relationship between the duration of the image frame and the duration of the image field and alters the predetermined display sequence such that the image fields are displayed in a sequence given by: (n−2) and (n−1), (n−1) and n, and (n+1) and (n+2). For the case where the image frame is selected to have a shorter duration than an image field the invention alters the predetermined sequence such that the image fields are displayed in a sequence given by: (n−2) and (n−1), (n−2) and (n−1), and (n+1) and (n+2).

It is noted that two fields, one odd and one even, are available at the output of the frame buffer 12. Thus, there are always two fields available permitting the display of an interlaced television frame on a high resolution non-interlaced monitor without a "splitting" artifact.

Figure 10:
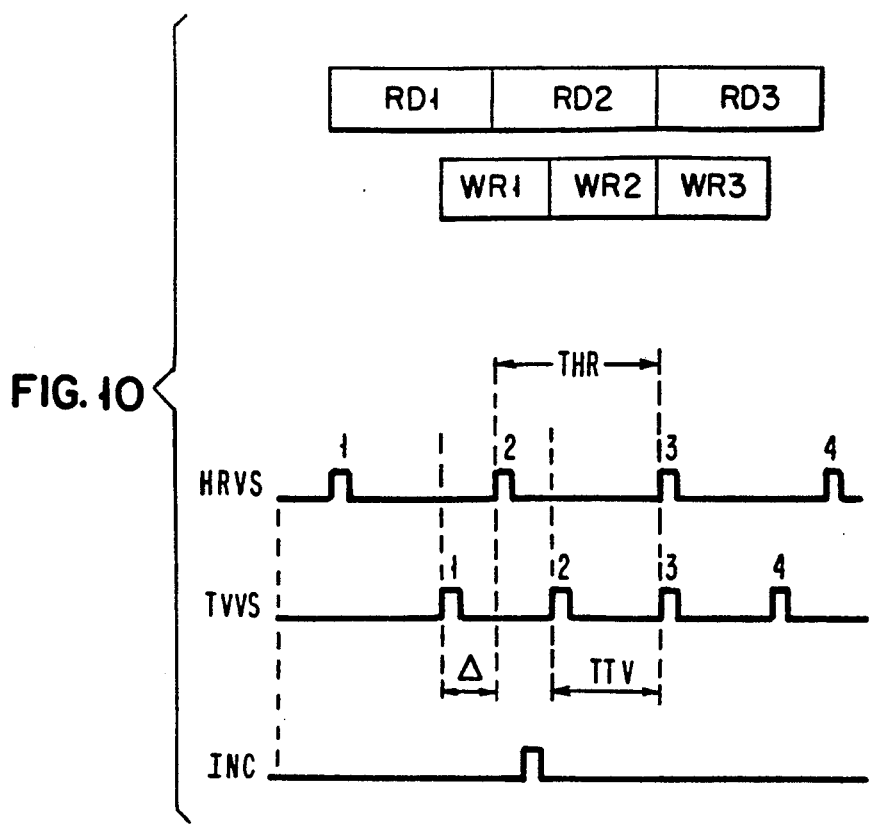
FIG. 10 is a timing diagram showing in greater detail a relationship of an increment (INC) signal in relation to high resolution and television vertical sync signals.

Delta calculation is further illustrated by the timing diagram of FIG. 10. Time intervals RD1, RD2, etc, correspond to periods of reading from the frame buffer 12 and time intervals WR1, WR2, etc, correspond to periods of writing to the frame buffer 12. During interval RD1 the reading process is completed before the correspondent locations of the frame buffer 12 are updated by a new television field during the WR1 interval. The RD2 interval is the last interval where it is "safe" to write into and read from the same memory field because the reading is completed just as writing is ended. Correspondingly, after the HRVS pulse 2 it is necessary to issue the INC signal so that the video refresh address for the high resolution period between HRVS pulses 3 and 4 is incremented. The value of delta, the time between the occurrence of TVVS and HRVS, provides a warning signal when $$\text{delta} + THR >= 2TTV,$$

where THR is the high resolution frame period and TTV is the television field period.

To provide a margin of safety it is assumed that the slowest television field frequency is 61 Hz and that the high resolution frame frequency is 59 Hz. Then, $$TTV = 1/61 = 16393 \text{ ns, and}$$

$$THR = 1/59 = 16949 \text{ ns, therefor}$$

$$\text{delta} = 2TTV - THR = 15387 \text{ ns.}$$

It is convenient to employ TVHS periods to measure delta. The TVHS period for NTSC is equal to $$TTV/262.5 = 16393/262.5 = 62.5 \text{ ns},$$

where 262.5 is a number of television lines in one field. Therefore, if the number of TVHS pulses between TVVS and HRVS becomes larger than (delta/62.5)=246, it indicates that the INC signal must be generated.

After the INC signal is generated delta continues to increase, but INC should not be generated again until delta becomes less than 246.

Control circuitry for providing access to the frame buffer 12 and for providing proper data flow for solving the problems noted previously is now described in greater detail.

Figure 11:
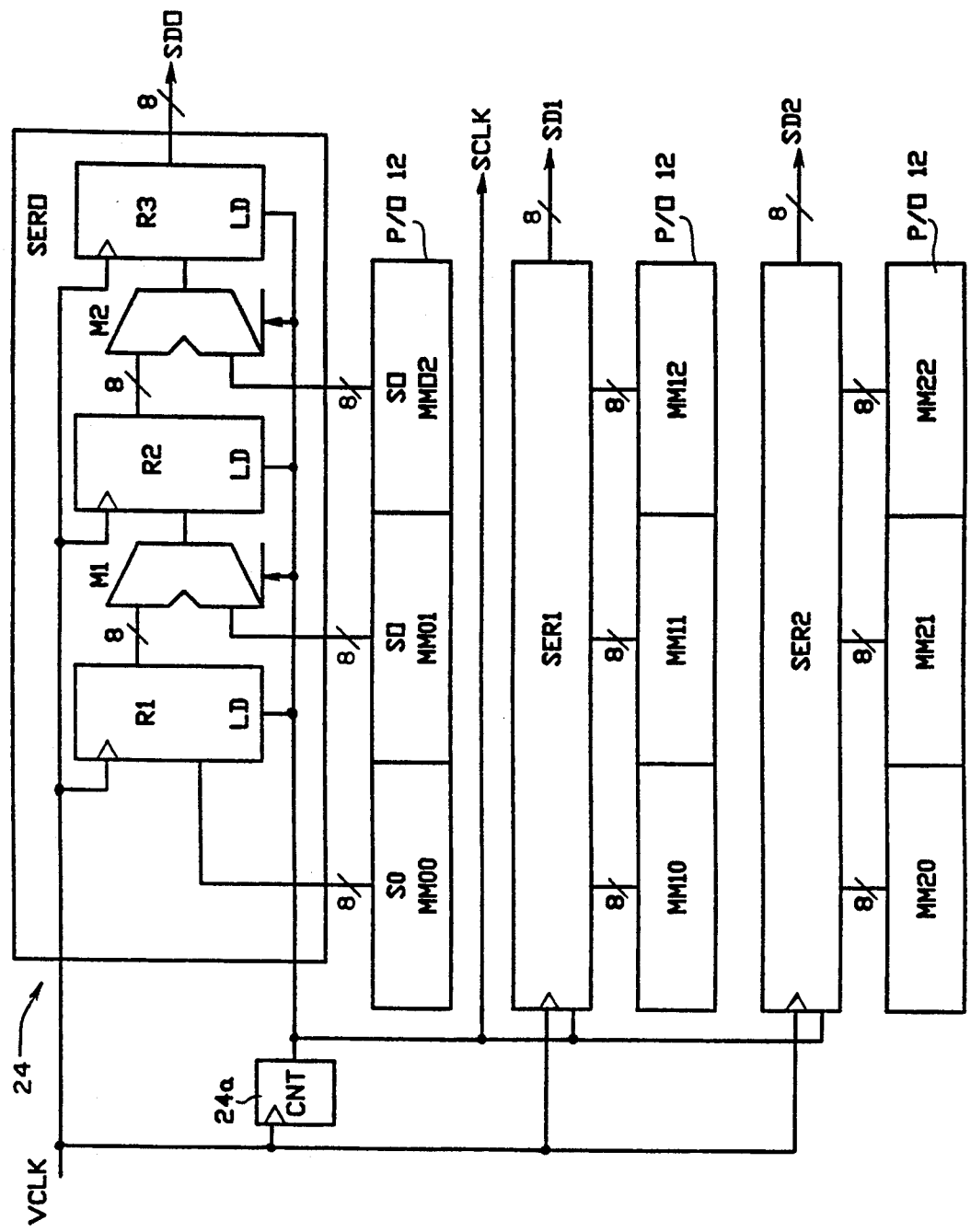
FIG. 11 is a block diagram that illustrates in greater detail the serializer block of FIGS. 2, 3 and 4.

The serializer 24 and frame buffer 12 connection is shown in greater detail in FIG. 11. The serializer 24 includes three identical components SER0, SER1 and SER2 which are essentially shift registers having a parallel load capability. The shift registers use the video clock VCLK as a shift clock. The shift registers are loaded from the frame buffer 12 during the active output of counter CNT 24a. CNT 24a divides VCLK by three, providing one VCLK period to load the registers inside the serializers SER0–SER2, and two VCLK periods to shift the data out of the registers. The multiplexors between the registers switch the inputs of the correspondent registers between the frame buffer serial data outputs SO during load and the outputs of the previous registers during shift. The output of the counter CNT 24a is also used as a serial clock SCLK to shift data out from the frame buffer 12 secondary port.

Figure 12:
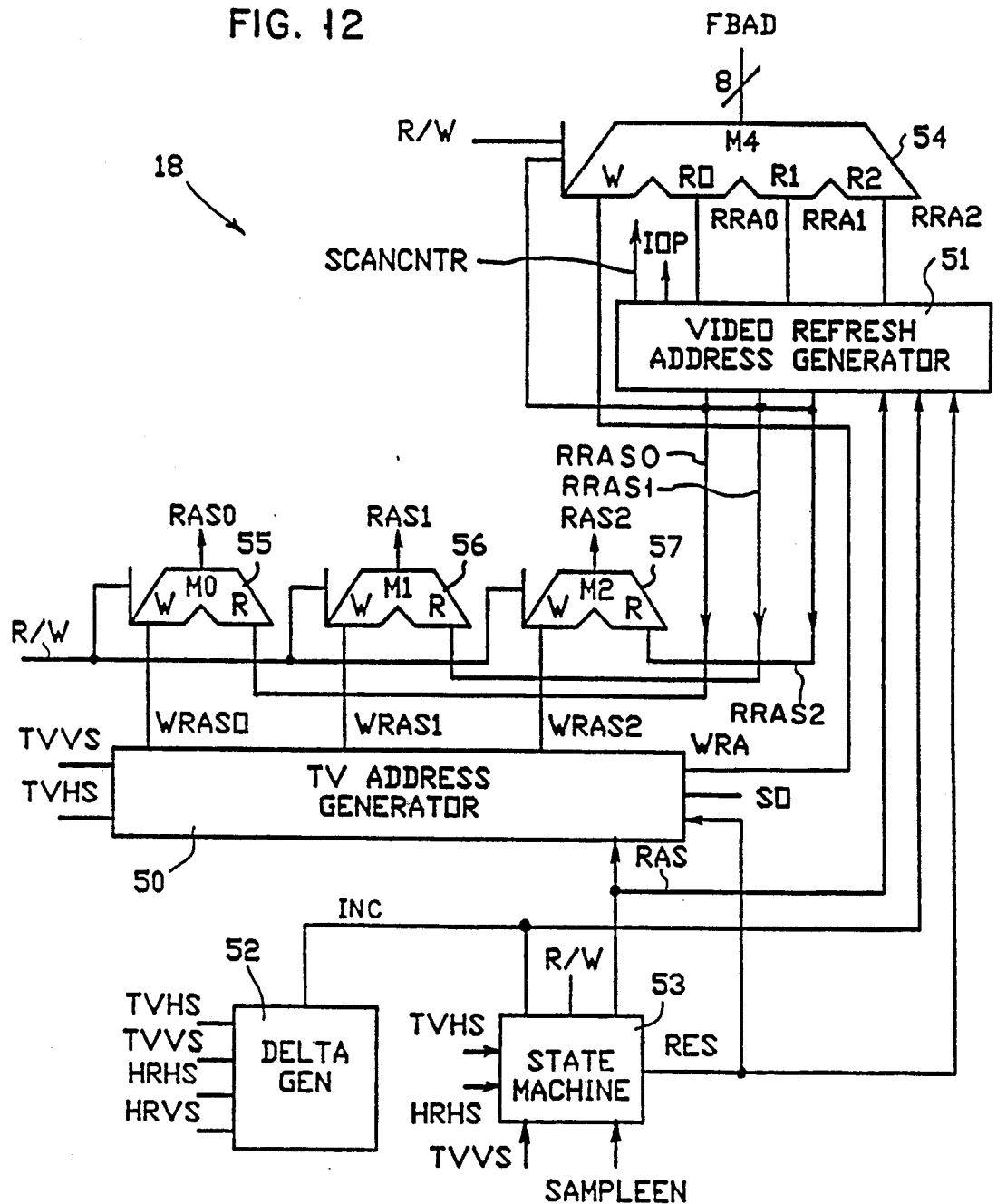
FIG. 12 is a block diagram that illustrates in greater detail the frame buffer controller block of FIGS. 2, 3 and 4.

The frame buffer controller 18 is illustrated in FIG. 12. Controller 18 includes a television address generator 50, video refresh address generator 51, delta generator 52, state machine 53, frame buffer address multiplexor 54 and row address strobe multiplexors 55, 56 and 57.

The TV address generator 50 provides a frame buffer write address WRA to the multiplexor 54 and generates WRAS0, WRAS1 and WRAS2 row address strobes for frame buffer write control during sampling (storage) of television data into the frame buffer 12. As was previously mentioned in regard to FIGS. 8a and 8b the write address sequence is a function of whether an even or an odd field is sampled, with the sequence repeating after six fields are written. In addition, each television line is stored into one of the rows of memory devices under control of the RAS strobes. The TV address generator 50 accepts TVVS and TVHS signals from the TV decoder 16 or SYNC selector 18a and switches a signal RAS, generated by a state machine 53, to one of three outputs WRAS0, WRAS1 and WRAS2 depending on what row of frame buffer 12 memory devices must store the sampled TV data.

The delta generator 52 generates the INC signal by measuring the time between TVVS and HRVS with the accuracy of one period of the television horizontal sync signal TVHS. It also uses HRHS for timing control. The INC output of the generator 52 is also input to the state machine 53 as an indication as to whether the value of delta is sufficiently small to begin the sampling process.

The state machine receives a sampling enable command SAMPLEEN from the host processor. When SAMPLEEN signal is active, the state machine 53 generates the necessary RAS timing for read or write cycles. The RES signal is issued after each SAMPLEEN signal in order to properly set counters in the address generators 50 and 51. The TVVS enables the state machine 53 to begin sampling from the beginning of the television frame. The polarity of the signal R/W indicates whether a read or a write cycle is being performed. The write cycle begins after each TVHS signal and lasts during an active television line. The read cycle corresponds to the HRHS signal. The process of writing sampled television data into the primary port of the frame buffer 12 interrupts HRHS for a short time in order to generate a transfer of a sampled television line to the secondary port of the frame buffer from where it is shifted out by an SCLK to the serializer 24.

After being reset by the state machine 53 the video refresh address generator 51 provides a sequence of frame buffer 12 read addresses RRA0, RRA1 and RRA2 to a frame buffer address multiplexer 54. It also generates three row address strobes RRAS0, RRAS1 and RRAS2 which are active during the frame buffer 12 video refresh time. The RAS signal from the state machine 53 assists the Video refresh address generator 51 in generating the RRA0-2 strobes. In addition, the Video refresh address generator 51 issues a SCANCNTR signal to the Scan Control 26 and an interpolation operation control signal IOP to the Interpolator 26a. The functions of these last two signals are described below.

Multiplexors 55, 56 and 57 allow row address strobes from the TV address generator 50 or row address strobes from the Video refresh address generator 51 to reach the frame buffer 12 during read and write cycles, respectively. The multiplexors are controlled by the signal R/W from the state machine 53.

The frame buffer 12 address multiplexor 54 connects the frame buffer 12 address bus FBAD to the WRA bus from the TV address generator 50 during write cycles, and to the RRA0-2 buses from the Video refresh address generator 54 during read cycles. Multiplexor 54 is controlled by the R/W signal from the state machine 50 which is, for example, low during read cycles and high otherwise. It should be noted that during a read cycle the signals RRAS0, RRAS1 and RRAS2 switch read addresses RRA0, RRA1 and RRA2, respectively, to the output of the multiplexor 54. Therefore, during write cycles all frame buffer 12 memory devices are addressed in common by the address WRA, but only one of the memory rows is enabled for writing under control of RAS0, RAS1 or RAS2. During read cycles three different addresses RRA0, RRA1 and RRA2 are applied to the frame buffer address bus, these addresses being time multiplexed by RRAS0-2. Thus, each row of the memory devices accepts its own associated address and three different lines are then loaded to the memory device secondary ports. The lines are then read in parallel and synchronously with SCLK.

It is noted that memory device column address control is not discussed for simplicity. This aspect of the operation of the memory devices is conventional and performed in accordance with the specific VRAM device specifications.

Figure 14:
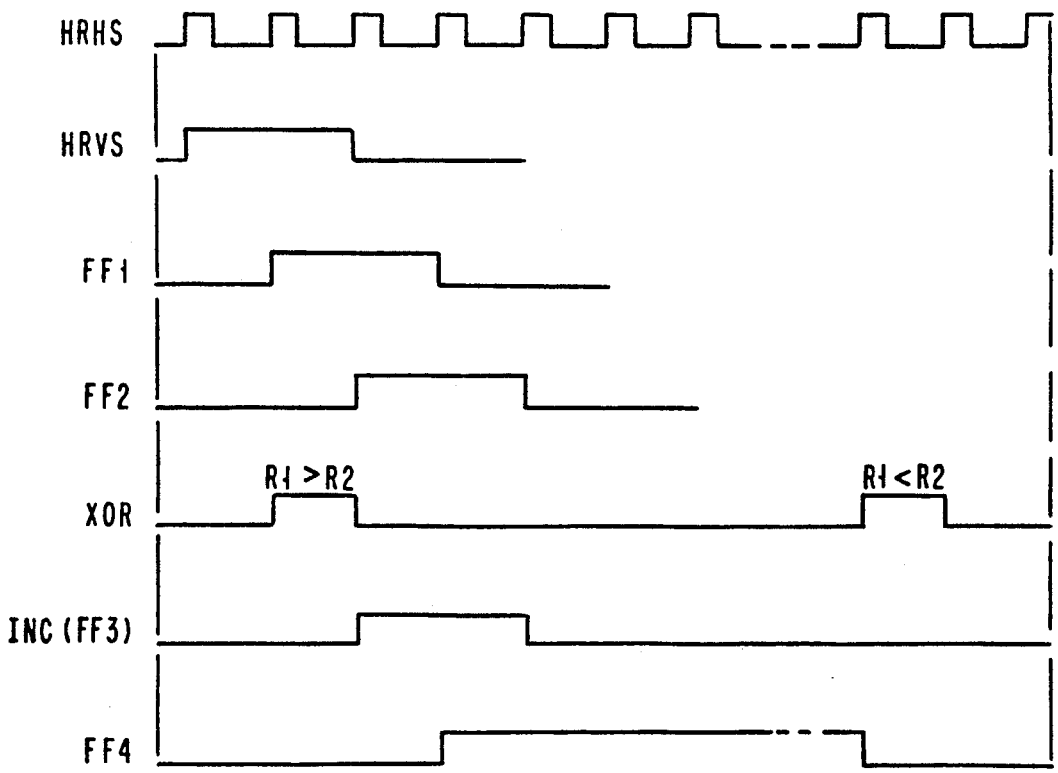
FIG. 14 is a timing diagram that illustrates the operation of the delta timing generator block of FIG. 13.
Figure 13:
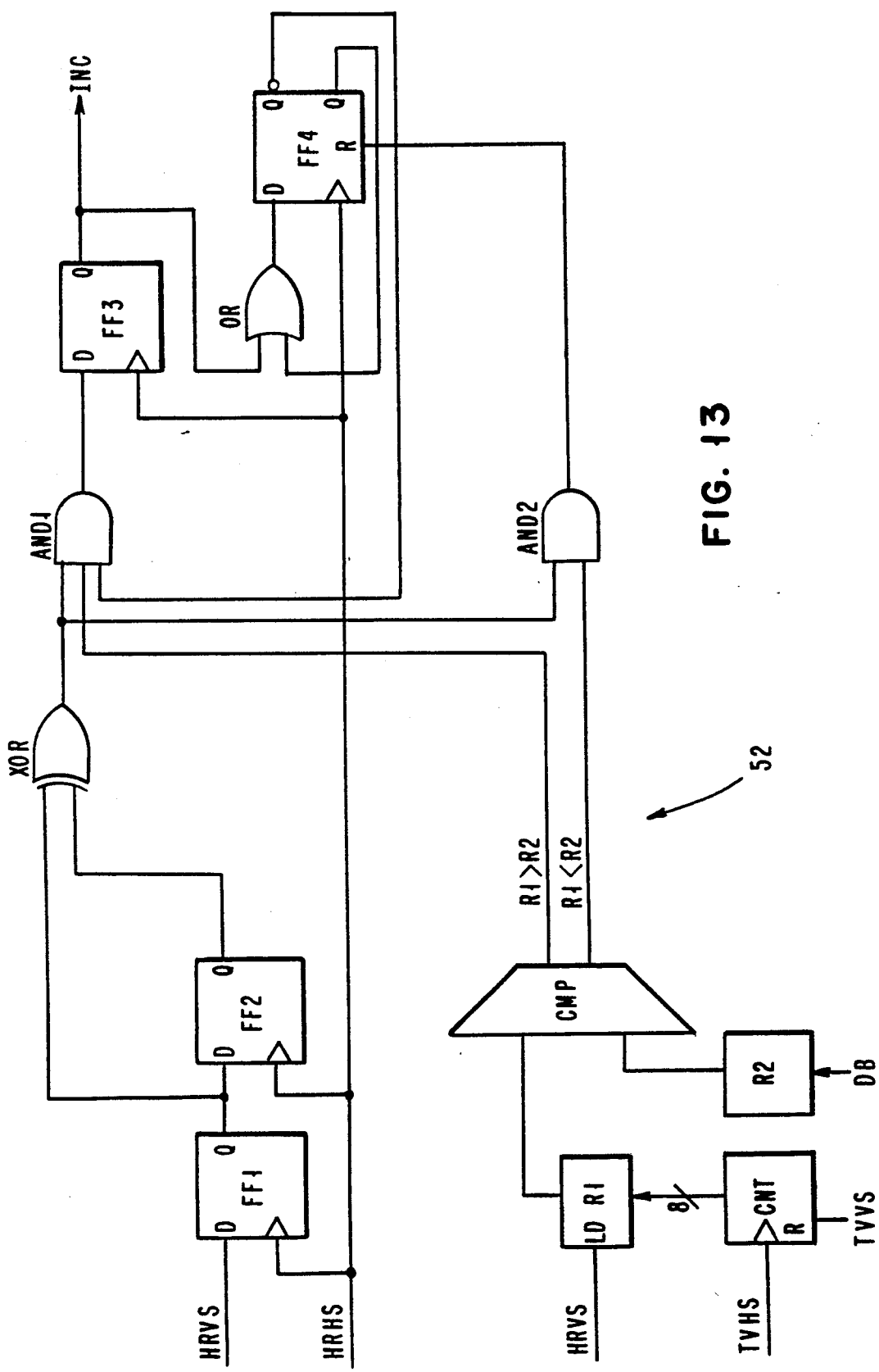
FIG. 13 is a block diagram that illustrates in greater detail the delta timing generator block of FIG. 12.

The delta generator is illustrated in the block diagram on FIG. 13 with reference to the timing diagram of FIG. 14. Counter CNT is reset by TVVS and uses TVHS as a clock. A HRVS pulse loads the CNT output into a register R1. Thus, the value stored in the register R1 represents the value of delta expressed in television line periods. Because this number is less than 255, eight bit resolution is sufficient for CNT and R1.

A host computer stores a critical delta number into a register R2 during system set-up time. As was previously shown, for the NTSC case the critical value of delta is equal to 246. The comparator CMP compares the outputs of R1 and R2, providing control of gates AND1 and AND2. In addition, other inputs of the AND1 and AND2 gates are connected to the output of XOR which, in accordance with the timing diagram on FIG. 14, provides a pulse with the length of HRHS during each HRVS.

If R1<R2 then the output of XOR passes through AND2 and resets flip/flop FF4. If R1>R2 then the AND1 output sets FF3 to a "one", starting the INC pulse. Next, the HRHS input sets the FF4 flip/flop, which in turn switches off AND2. The following HRHS resets FF3 thus terminating INC. Meanwhile, FF4 stays set due to the feedback from the FF4 Q output to the D input through the OR gate. As a result, INC is generated once when the value of delta becomes larger than the number stored in the register R2, and circuit 52 will become ready to again generate the INC signal only after the data stored in R1 becomes less than the data stored in R2.

Figure 15:
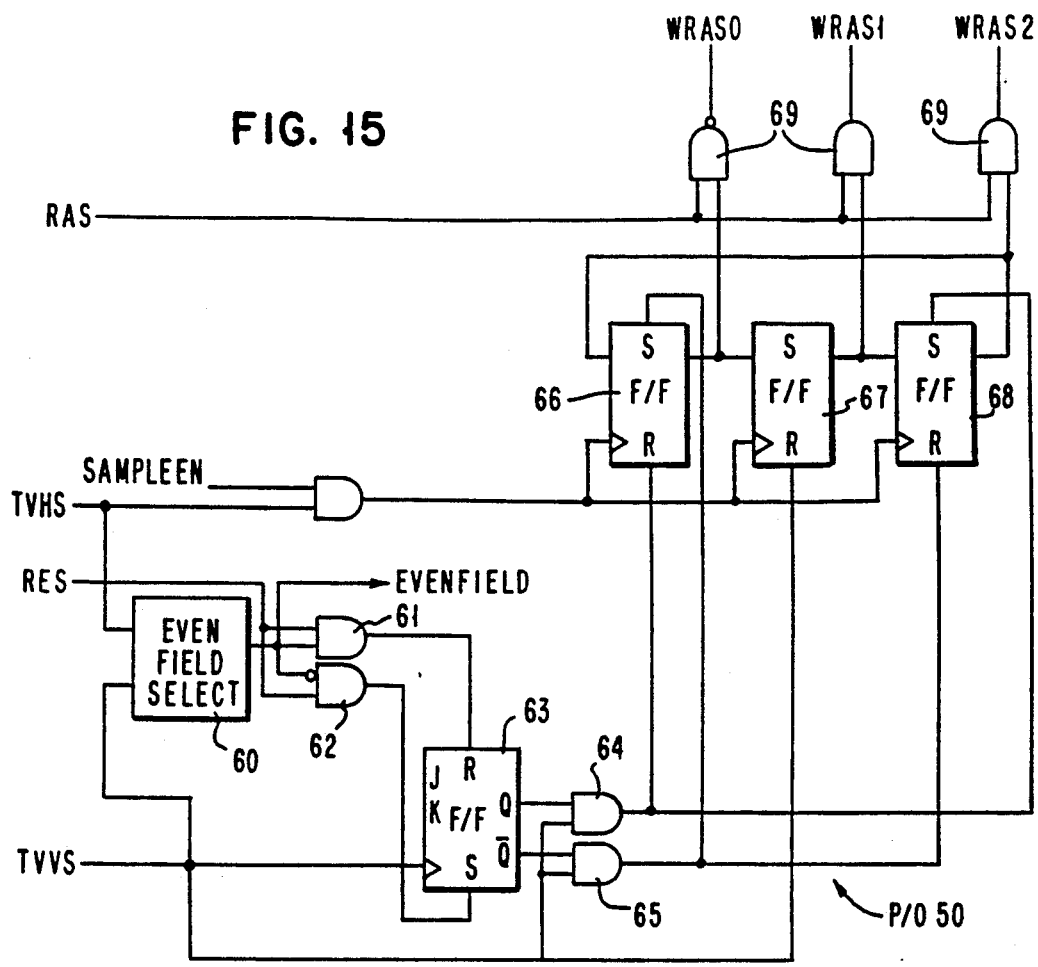
FIG. 15 is a block diagram that illustrates in greater detail a portion of the television address generator block of FIG. 12.
Figure 16:
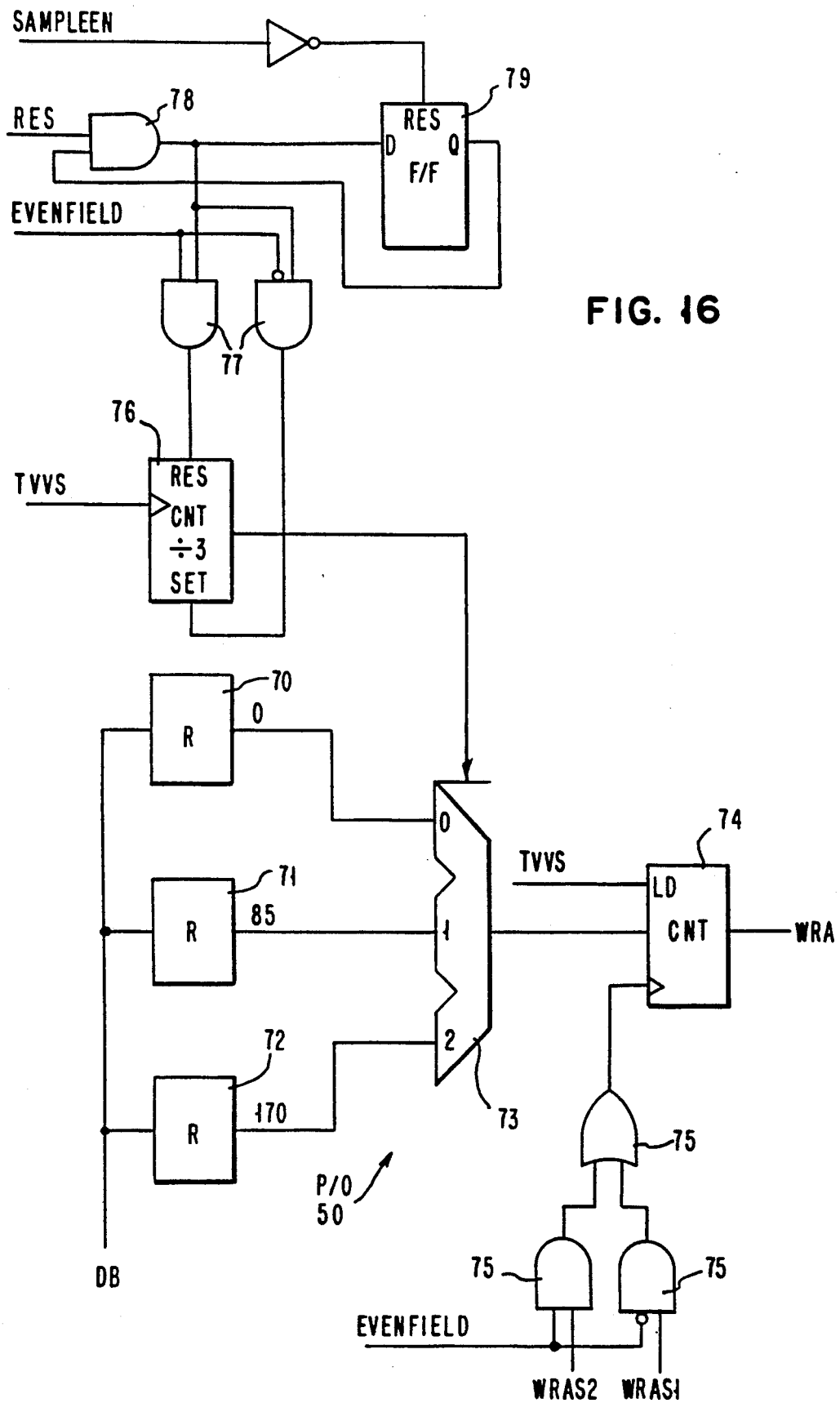
FIG. 16 is a block diagram that illustrates in greater detail another portion of the television address generator block of FIG. 12.

The TV address generator 50 is comprised of two major blocks. The first block generates strobes WRAS0-2 and is illustrated in FIG. 15. The second block generates the WRA address and is shown in FIG. 16.

The F/Fs 66, 67 and 68 of FIG. 15 are set by a TVVS pulse to the states 1, 0, 0, respectively, at the beginning of even fields and to the states 0, 0, 1, respectively, at the beginning of odd fields. The TVHS pulse shifts the data in F/Fs 66, 67 and 68 each new television line. The state machine 53 applies the RAS strobes to the gates 69 after sampling is enabled.

During even fields, the first sampled television line is accompanied by the WRAS0 signal formed from the RAS signal. Subsequently, the first TVHS pulse after SAMPLEEN becomes active shifts the data in the F/Fs 66, 67 and 68 to the state 010 and WRAS1 is formed from the RAS strobe. The next TVHS pulse shifts the F/F data to the state 001 thereby generating WRAS2 from RAS. Due to the connection from the output of F/F 68 to the input of F/F 66 the data pattern 100 is repeated again during the fourth line to be sampled. As a result, during even fields the first sampled line is stored in the first row of the memory devices, the next line is written in the second row and so forth in accordance with FIGS. 8a and 8b.

During odd fields, the first sampled television line is accompanied by the WRAS2 signal, the second sampled line by WRAS0, and the third by WRAS1. Therefore, the first line is stored in the third row of the memory devices, the second in the first row and the third in the second row.

The Even Field Selector 60 examines the phase difference between TVVS and TVHS pulses. For even fields, the phase is 0 and the output of the selector 60 is high. During the beginning of odd fields the phase is equal to half of television line period, switching the selector 60 output to zero. Therefore, during even fields, the RES signal from the state machine 53 resets F/F 63, the output of which allows TVVS to appear on the output of gate 65 to set F/F 66 and reset F/F 68. The F/F 67 is always reset by TVVS. During odd fields F/F 63 is set and the output of gate 64 sets F/F 68 and resets F/F 66 to zero.

The write address generator of FIG. 16 contains three data registers 70, 71 and 72 having inputs connected to the data bus DB. The host computer writes the values 0, 85 and 170 into these registers during system set-up time. Depending on the state of a counter 76 the multiplexor 73 connects one of the registers 70, 71 or 72 to the inputs of a counter 74. The counter 74 is loaded by a TVVS pulse from the output of multiplexor 73 and is incremented by the signal WRAS1 during odd fields and by the signal WRAS2 during even fields. The count control of the counter 74 is provided by the logic 75 in the manner illustrated. Counter 76 is clocked by the TVVS signal and divides the television vertical sync frequency by three. The gates 77 control whether the RES pulse sets or resets the counter 76. Counter 76 is reset if the sampling process starts from an even field and is set if the sampling process starts from an odd field. As a result, the sampling process starts from a zero address if the first field to be sampled is even and starts from an address equal to 85 if the first field sampled is odd.

The output of the gate 78 also sets the F/F 79 which disables gate 78 assuring that the counter 76 is set or reset only once during the sampling. The F/F 79 is reset during a passive state of the SAMPLEEN signal.

In accordance with the circuit of FIG. 16 at the beginning of a sampling process, and if the first sampled TV field is even, the counter 76 permits the address zero to be loaded into counter 74. After WRAS0, WRAS1 and WRAS2 are generated, from FIG. 15, the counter 74 is incremented, providing the frame buffer 12 with an address of one for the next three television lines. During the first line sampling in the next field, which is an odd field for this example, the counter 76 is incremented, allowing the value of 85 stored in register 71 to be loaded to the counter 74. Then WRAS2 loads sampled data into the row address 85 of the third row of the frame buffer 12 memory devices. The next two lines are also sampled into the row address 85, but to the first memory row MM00-02 by the WRAS0 signal, and to the second memory row MM10-12 by the WRAS1 signal. The WRAS1 signal increments the counter 74 to the address 86, and the process repeats in the same manner until the odd field is completely sampled. When the next (even) field is sampled the counter 76 again increments allowing the number 170 stored in R 72 to be loaded into the counter. As a result, the write address sequence corresponds to that shown in FIG. 8b.

Figure 17:
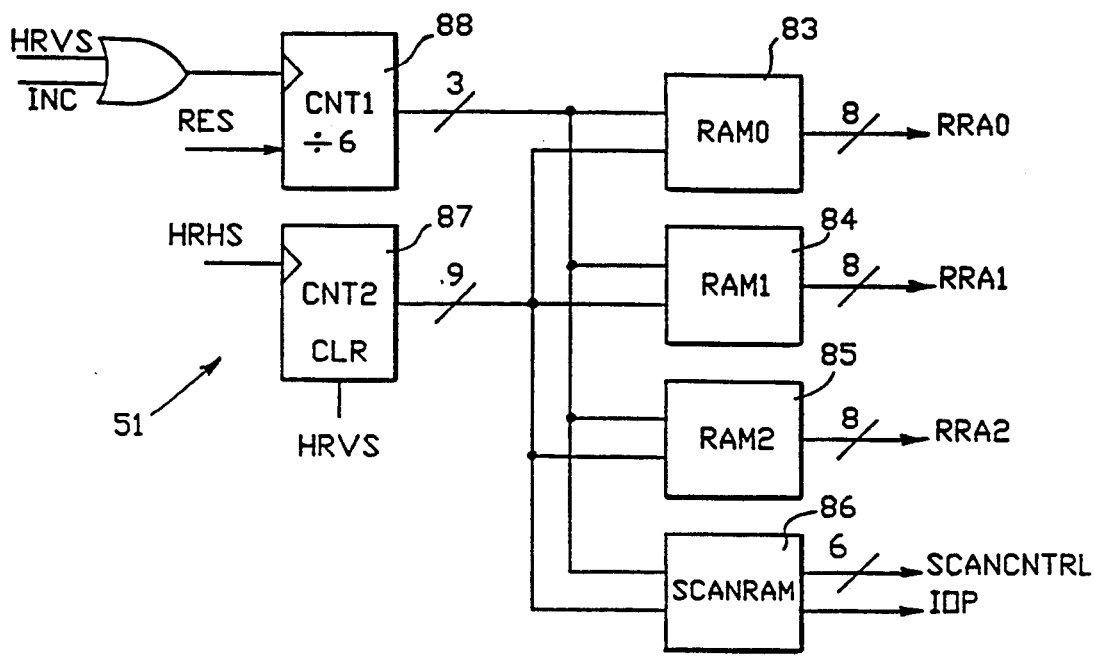
FIG. 17 is a block diagram that illustrates in greater detail the video refresh address generator block of FIG. 12.
Figure 18:
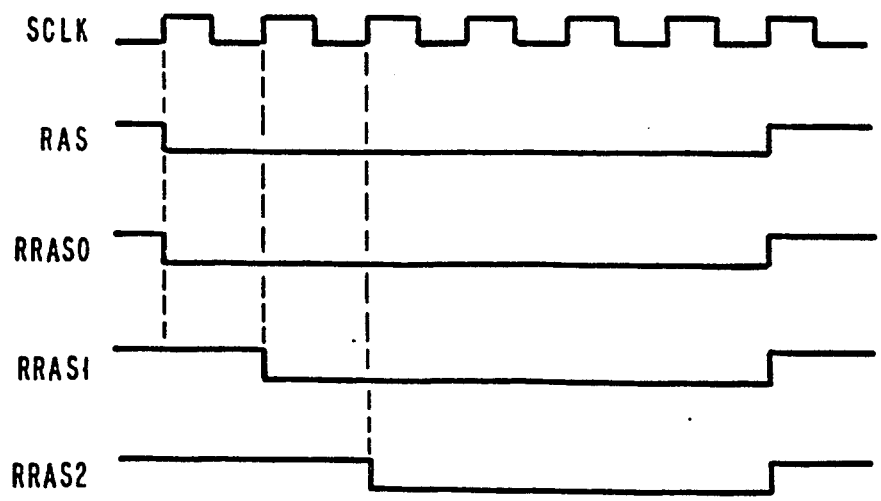
FIG. 18 is a timing diagram that illustrates the operation of the video refresh address generator block of FIG. 17.

The Video Refresh Address Generator 51 is illustrated in FIG. 17. During a read cycle the state machine 53 provides a RAS signal which is delayed by F/Fs 81 and 82 to produce three row address strobes RRAS0, RRAS1 and RRAS2, as depicted in the timing diagram of FIG. 18. As shown in FIG. 12 during a frame buffer 12 read (video refresh) operation each strobe is connected to frame buffer 12 memory devices through an associated multiplexor 55, 56 or 57 and the falling edge of each RRAS signal enables a corresponding address RRA0, RRA1 and RRA2 to the frame buffer 12 through the multiplexor 54. As a result, each individual memory row receives a video refresh address.

The video refresh address is generated by three RAM memory devices RAM0 83, RAM1 84 and RAM2 85. RAM0 83 provides a sequence of addresses for the upper row of the memory chips, RAM1 supplies addresses for the middle row, and RAM2 generates addresses for the bottom row. RAMs 3-85 have a common address bus the upper bits of which are provided by counter CNT1 88. CNT1 88 begins counting after being reset to zero by the RES signal at the beginning of sampling and subsequently counts by modulo six. The lower address bits of RAMs 83-85 correspond to the high resolution display line number supplied by a counter CNT2 87. CNT2 87 is reset by the HRVS signal and subsequently counts the number of high resolution lines using the HRHS signal as a clock.

For the case of FIG. 2, where there is no TV decoder at the output of the frame buffer 12, the sequence of addresses stored in the RAMs 83-85 is illustrated in FIG. 21. FIG. 21 is best understood in relation to FIG. 8b which shows the write address distribution. It is assumed that, in accordance with FIG. 8b, fields 0 and 1 are already sampled and field 2 is currently being sampled. Fields 0 and 1 are read from the frame buffer 12 to provide a non-interlaced frame that is a combination of these two fields. It is noted that the odd field is the last to have been sampled and is therefore considered as a current field in the interpolating scheme. Thus, when the odd line is shown on the screen it is brought from the frame buffer 12 directly to the input of the interpolator 26a, and when the even line is displayed, it is read from the frame buffer 12 together with two odd lines, one above and one below the even line. As a result, all three lines are presented to the inputs of the interpolator 26a. The interpolator 26a compares three adjacent and vertically located pixels, where two of the pixels belong to "current" odd lines and where one belongs to a "previous" even line. Based on the result of comparison, the interpolator 26a determines whether to allow the previous pixel or a mean value of all three pixels to be sent to the screen. It should be noted that in another embodiment some other combination of pixel values could be used. That is, instead of the mean value an interpolated value of two current pixels may be sent to the screen. In any case, three lines are required for interpolation. In order to instruct the interpolator 26a to either pass the line to the output or to, instead, interpolate it, a SCANRAM 86 is used. SCANRAM 86 provides an "interpolation operation" bit IOP. If IOP is equal to zero no interpolation is accomplished, and if IOP is equal to one interpolation occurs.

The first column FIG. 21 shows the displayed line number. If line 1 is displayed, it is read from field buffer B3 address 85. If line 2 is displayed, then three lines are read from the frame buffer 12 from the location 85 in the memory field B3, location 0 in the memory field A2 and from location 85 in field B1. The IOP field indicates to the interpolator 26a whether to interpolate the pixel values or whether to send them directly to the display screen. The sequence of addresses is readily calculated from the information provided in FIG. 8a. Next, fields 1 and 2 are read from the frame buffer 12. The address sequence may be derived from write addresses for fields 1 and 2 in FIG. 8a. Similarly, other address sequences for all possible combinations of field pairs are derived. There are six different sequences for reading from the frame buffer 12 the field pairs (0,1), (1,2), (2,3), (3,4), (4,5) and (5,6). Fields (6,7) are read in the same manner as fields (0,1), fields (7,8) are read in the same manner as fields (1,2), etc.. CNT1 88 of FIG. 17 provides a value for choosing what field pair is read next.

If, after field pair 1 and 2 is read, the INC signal is generated the Video refresh address generator 51 operates to skip the reading of field pair 2 and 3 and to read instead field pair 3 and 4. Thus, the INC signal causes CNT1 88 to increment causing the next address sequence to read field pair (3,4) instead of (2,3).

As can be appreciated the line order presented to the input of the interpolator 26a should be consistent. For example, three consecutive lines 1, 2 and 3 may be considered as "top", "middle" and "bottom" lines. Hence, all "top" lines should be applied to the same input of the interpolator 26a. Thus, if the interpolator has three input buses, one bus must always receive a "top" line, one bus always receives a "middle" line and one input bus always receives a "bottom" line. However, if the interpolator 26a input buses are connected directly to the serial outputs of the serializer 24, which in turn is connected to the serial outputs of the top, middle and bottom row of frame buffer 12 memory devices, the order of the lines appearing on the inputs of the serializer 24 change in a manner as shown in the ORDER OF LINES column of FIG. 21.

Figure 19:
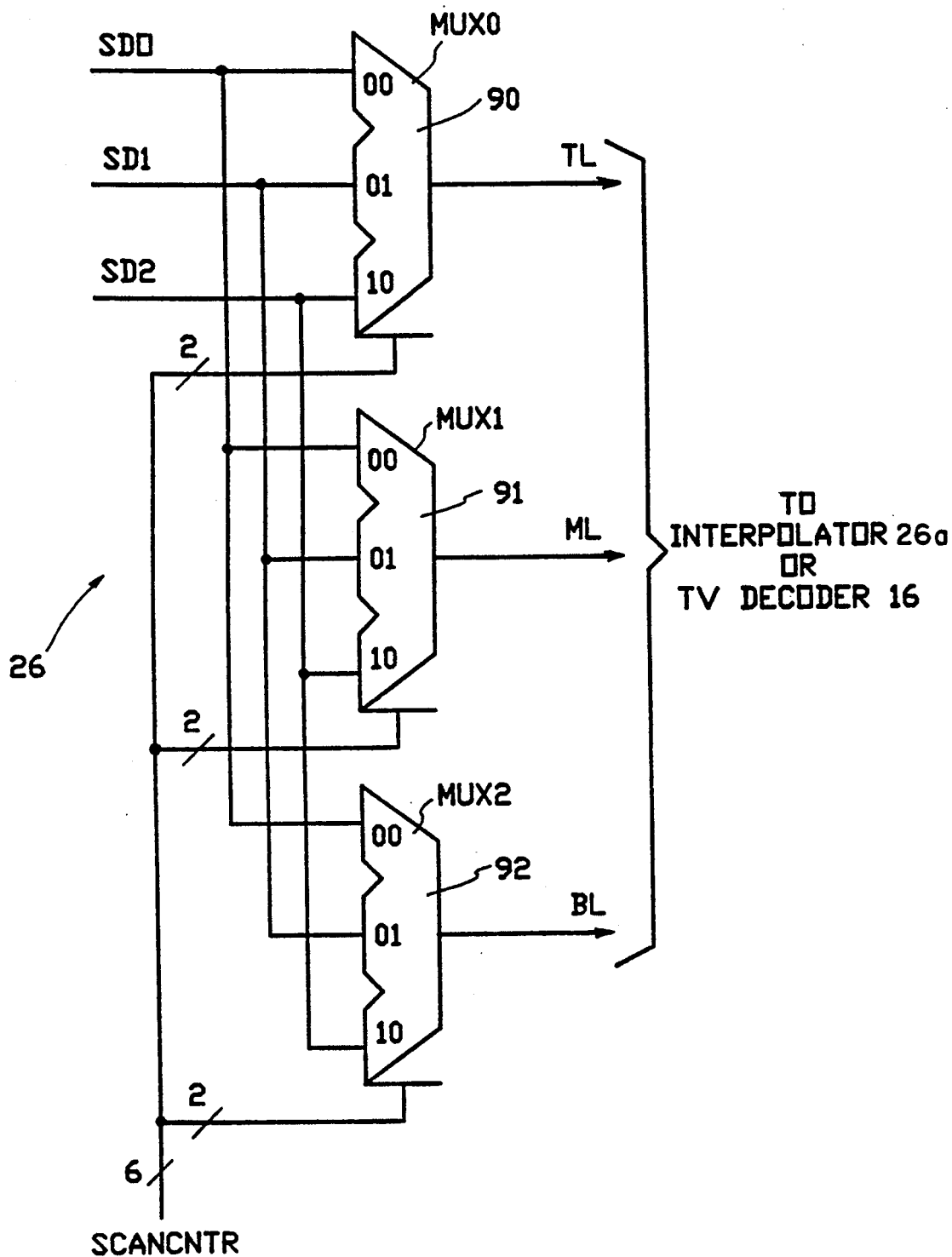
FIG. 19 is a block diagram that illustrates in greater detail the scan control block of FIGS. 2, 3 and 4.

In accordance with an aspect of the invention the order of the lines is corrected by the Scan Control 26 block illustrated in FIG. 19. The serial video data buses SD0, SD1 and SD2 from the serializer 24 (FIG. 11) are coupled to three multiplexors MUX0 90, MUX1 91 and MUX2 92 which are controlled by a 6 bit SCANCNTR input from the output of SCANRAM 86 of FIG. 17. The SCANCNTR CODE output by SCANRAM 86 is also shown in FIG. 21. Using the SCANCNTR CODE the Top Line (TL) output of MUX0 90 provides the top line to the interpolator 26a, the Middle Line (ML) output of MUX1 91 always provides the middle line, and the Bottom Line (BL) output of MUX2 92 always provides the bottom line.

For the case of FIG. 3, where the TV decoder 16 follows the Scan Control 26, another line sequence code is loaded into the RAMs 83–86 of FIG. 17. Preferably the TV decoder 16 receives three lines from the same field in order to restore the Luminance and Chrominance (Y, C) signals. The table illustrated in FIG. 22 illustrates this process. This table is similar in some respects to the table illustrated in FIG. 21, showing that in order to display line 2, lines 0, 2 and 4 are read from the frame buffer. The required sequences of field buffers, row addresses and order of lines is also illustrated in FIG. 22.

For the case of FIG. 4, where both the interpolator 26a and TV decoder 16 are provided, the interpolator 26a still receives three lines from two fields while the TV decoder 16 still receives three lines from the same field, for a total of four lines. In order to provide more than three lines in parallel, while only three lines are read from the frame buffer 12, the line memories 34 are employed to provide the interpolator 26a with the necessary lines after the lines are decoded by the TV decoder 16.

Figure 20:
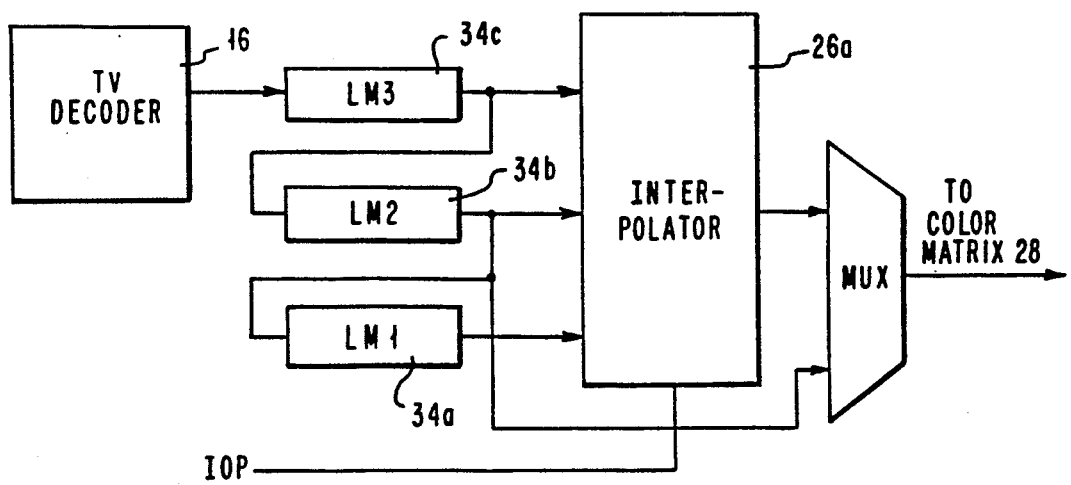
FIG. 20 is a block diagram that illustrates in greater detail the organization of the line memories of FIG. 4.

FIG. 20 shows the line memories 34 in greater detail. The line memories 34 are comprised of three Line Memories L7 (LM1 34a, LM2 34b and LM3 34c) each of which stores one TV line. Data from the TV decoder 16 is sequentially shifted through the three line memories. The outputs of the line memories provide the necessary sequence of television lines to the interpolator 26a, as shown in the table of FIG. 23. Lines 1, 3 and 5 are read from the frame buffer 12 to the TV decoder 16 which in turn extracts line 3 and sends it the line memory LM3 34c. Lines 2, 4 and 6 are next read from the frame buffer 12, line 4 is decoded by the TV decoder 16 and stored in LM3 34c while line 3 is shifted to LM2 34b. In the next cycle, lines 3, 5 and 7 are read from the frame buffer 12, line 5 is decoded by the TV decoder 16 and stored in LM3 34c while line 4 is shifted to LM2 34b and line 3 is shifted to LM1 34a. Thus, the outputs of LM3, LM2 and LM1 provide the correct line sequence to the interpolator 26a.

Although the invention has been described above in the context of specific memory devices and organizations and specific television standards and the like it should be realized that the practice of the invention is not to be construed to be limited to only these embodiments. As such, while the invention has been particularly shown and described with respect to presently preferred embodiments thereof, it will be understood by those skilled in the art that changes in form and details may be made therein without departing from the scope and spirit of the invention.

Having thus described my invention, what I claim as new, and desired to secure by Letters Patent is:

1. Apparatus for coupling an image signal expressive of an interlaced image to image display means for display during a display frame, the interlaced image being comprised of a plurality of sequentially provided image fields, the apparatus comprising:

means for providing the image fields in a digital form;

buffer memory means having an input coupled to the providing means and an output coupled to the image display means, the buffer memory means comprising a sufficient number of storage locations for storing at least three of the image fields, wherein the buffer memory means is organized as a plurality of memory blocks each of which stores a portion of each one of the at least three image fields; and means for reading out of the buffer memory means two previously stored image fields for display by the image display means while writing into the buffer memory means an image field currently being provided by the image field providing means.

2. Apparatus as set forth in claim 1 wherein the buffer memory means is organized as a plurality of memory blocks each of which stores a portion of one of three image fields.

3. Apparatus as set forth in claim 1 wherein the buffer memory means is organized as a three by three arrangement of nine memory blocks, a four by three arrangement of 12 memory blocks or an eight by three arrangement of 24 memory blocks, each of which stores a portion of one of three image fields, wherein each of the image fields is comprised of a plurality of image lines, and wherein one of the stored image fields is comprised of even numbered lines of the interlaced image and wherein one of the stored image fields is comprised of odd numbered lines of the interlaced image.

4. Apparatus as set forth in claim 1 wherein for consecutively provided image fields numbered 1, 2, 3, 4, 5 ... n ... the means for reading out reads out the image fields two at a time in accordance with a predetermined sequence give by: 1 and 2, 2 and 3, 3 and 4, 4 and 5, ... . (n−1) and n, n and (n+1).

5. Apparatus as set forth in claim 4 wherein each of the image fields has a first time duration associated therewith, wherein the display frame has a second time duration associated therewith, and wherein the means for reading out is responsive to a difference between the first and the second time durations for periodically altering the predetermined sequence.

6. Apparatus as set forth in claim 5 wherein the first time duration differs from the second time duration and is unsynchronized therewith.

7. Apparatus as set forth in claim 6 wherein the display frame has a longer duration than a longest duration of an image field and wherein the predetermined sequence is altered such that the image fields are displayed in a sequence given by: (n−2) and (n−1), (n−1) and n, and (n+1) and (n+2).

8. Apparatus as set forth in claim 6 wherein the display frame has a shorter duration than a shortest duration of an image field and wherein the predetermined sequence is altered such that the image fields are displayed in a sequence given by: (n−2) and (n−1), (n−2) and (n−1), and (n+1) and (n+2).

9. Apparatus as set forth in claim 1 wherein the image signal includes a composite color television signal and wherein the apparatus further comprises means, serially coupled between the digital signal providing means and the buffer memory means, for decoding the digital signal into a digital signal expressive of luminance, a digital signal expressive of chrominance and a signal expressive of a television vertical synchronization signal.

10. Apparatus as set forth in claim 1 wherein the image signal includes a composite color television signal and wherein the apparatus further comprises means, serially coupled between the buffer memory means and the display means, for decoding the digital signal into a digital signal expressive of luminance, a digital signal expressive of chrominance and a signal expressive of a television vertical synchronization signal.

11. Apparatus as set forth in claim 6, wherein the image signal includes a composite color television signal, wherein the apparatus further comprises means, serially coupled between the digital signal providing mans and the display mans, for decoding the digital signal and for extracting at least a first vertical synchronization signal therefrom, and wherein the means for reading out is coupled to the first vertical synchronization signal and to a second vertical synchronization signal associated with the display means for detecting a difference in time between an occurrence of the first and the second vertical synchronization signals.

12. Apparatus as set forth in claim 11 wherein the means for reading out alters the predetermined sequence when a predetermined difference in time between an occurrence of the first and the second vertical synchronization signals is detected, the predetermined difference in time indicating that an insufficient amount of time will be available to read out an image field before the associated buffer memory storage locations are required for storing a next image field.

13. A method of displaying an image signal expressive of an interlaced image with a non-interlaced image display means, the interlaced image being comprised of a plurality of separately provided image fields, the method comprising the steps of:
storing in a first buffer means a first image field;
storing in a second buffer means a second image field;
reading the first and the second buffer means;
displaying with non-interlaced image display means the first and the second image fields as a single image frame; and
while performing the step of reading the method includes a step of storing in a third buffer means a third image field; wherein
the first buffer means, the second buffer means, and the third buffer means are included within a buffer memory means that is comprised of a plurality of memory blocks, and wherein each of the plurality of memory blocks stores a portion of the first image field, the second image field, and the third image field.

14. A method as set forth in claim 13 wherein for image fields numbered 1, 2, 3, 4, 5 ... n ... the step of reading out reads the image fields two at a time in accordance with a predetermined sequence given by: 1 and 2, 2 and 3, 3 and 4, 4 and 5, ... (n−1) and n, n and (n+1).

15. A method as set forth in claim 14 wherein each of the image fields has a first time duration associated therewith, wherein the image frame has a second time duration associated therewith, and wherein the step of reading includes the steps of:
determining a temporal relationship between the first time duration and the second time duration; and
responsive to a comparison with a predetermined temporal relationship, altering the predetermined sequence.

16. A method as set forth in claim 15 wherein the first time duration differs from the second time duration and is unsynchronized therewith.

17. A method as set forth in claim 16 wherein the image frame has a longer duration than a longest duration of an image field and wherein the step of altering alters the predetermined sequence such that the image fields are displayed in a sequence given by: (n−2) and (n−1), (n−1) and n, and (n+1) and (n+2).

18. A method as set forth in claim 16 wherein the image frame has a shorter duration than a shortest duration of an image field and wherein the step of altering alters the predetermined sequence such that the image fields are displayed in a sequence given by: (n−2) and (n−1), (n−2) and (n−1), and (n+1) and (n+2).

19. A method as set forth in claim 13 wherein the image signal includes a composite color television signal and wherein the step of storing includes an initial step of decoding the composite television signal into a digital signal expressive of luminance, a digital signal expressive of chrominance and a signal expressive of a television vertical synchronization signal.

20. A method as set forth in claim 13 wherein the image signal is comprised of a composite television signal and wherein the step of displaying includes an initial step of decoding the composite television signal into a digital signal expressive of luminance, a digital signal expressive of chrominance and a signal expressive of a television vertical synchronization signal.

21. A method as set forth in claim 16 wherein the step of determining a temporal relationship includes a step of detecting a difference in time between an occurrence of a first vertical synchronization signal associated with the interlaced image signal and an occurrence of a second vertical synchronization signal associated with the display means.

22. A method as set forth in claim 21 wherein the step of altering alters the predetermined sequence when a predetermined difference in time between an occurrence of the first and the second vertical synchronization signals is detected.

23. A method as set forth in claim 13 and including a step of processing the stored image fields before the step of displaying is performed.

24. A method as set forth in claim 23 wherein the step of processing processes three vertically disposed pixels associated with an odd and with an even image field.

25. A method as set forth in claim 24 wherein the step of processing interpolates at least two vertically disposed pixels to derive a value of a single displayed pixel.

26. A method as set forth in claim 24 wherein the step of processing determines a mean of three vertically disposed pixels to derive a value of a single displayed pixel.

27. Apparatus for coupling an image signal expressive of an interlaced television video image to a non-interlaced high resolution image display means for display during a high resolution display frame, the interlaced television video image being comprised of a first image field comprised of even numbered field lines and of a second image field comprised of odd numbered field lines, the apparatus comprising:

means for providing the first and the second image fields in a digital form;

frame buffer memory means having an input coupled to the providing means and an output coupled to the high resolution image display means, the frame buffer memory means comprising a sufficient number of storage locations for storing at least three image fields, said frame buffer memory means being organized as an (n) by (m) arrangement of memory blocks wherein both n and m are greater than one, and wherein each of said memory blocks stores a position of each of the three image fields; and means for reading out of the frame buffer memory means two previously stored image fields for display by a non-interlaced image display means while writing into the frame buffer memory means an image field currently being provided by the image field providing means.

28. Apparatus as set forth in claim 27 wherein for consecutively provided image fields numbered 1, 2, 3, 4, 5 . . . n . . . the means for reading out reads out the image fields two at a time in accordance with a predetermined sequence given by: 1 and 2, 2 and 3, 3 and 4, 4 and 5, . . . (n−1) and n, n and (n+1).

29. Apparatus as set forth in claim 28 and further comprising means for determining a phase difference between a high resolution frame period and a television field period, the determining means having an output coupled to the means for reading out for periodically causing the means for reading out to alter the predetermined sequence.

30. Apparatus as set forth in claim 29 wherein the high resolution frame period has a longer duration than a longest duration of a television field period and wherein the predetermined sequence is altered such that the image fields are displayed in a sequence given by: (n−2) and (n−1), (n−1) and n, and (n+1) and (n+2).

31. Apparatus as set forth in claim 29 wherein the high resolution frame period has a shorter duration than a shortest duration of a television field period and wherein the predetermined sequence is altered such that the image fields are displayed in a sequence given by: (n−2) and (n−1), (n−2) and (n−1), and (n+1) and (n+2).

32. Apparatus as set forth in claim 27 wherein the television video signal is a composite color television signal and wherein the apparatus further comprises means, serially coupled between the digital signal providing means and the frame buffer memory means, for decoding the digital signal into a digital signal expressive of luminance, a digital signal expressive of chrominance and a signal expressive of a television vertical synchronization signal.

33. Apparatus as set forth in claim 27 wherein the television video signal is a composite color television signal and wherein the apparatus further comprises means, serially coupled between the frame buffer memory means and the noninterlaced display mans, for decoding the digital signal into a digital signal expressive of luminance, a digital signal expressive of chrominance and a signal expressive of a television vertical synchronization signal.

34. Apparatus as set forth in claim 27 and further including means, serially coupled between the frame buffer memory means and the high resolution display means, for receiving a plurality of vertically disposed television image pixels and for generating one high resolution image pixel therefrom.

35. Apparatus as set forth in claim 34 and further comprising a plurality of television line buffer means serially coupled to an input of the receiving and generating means.

36. Apparatus as set forth in claim 27 and further comprising means for coupling the apparatus to a host data processing system.

37. Apparatus as set forth in claim 29 wherein the predetermined phase difference is related to the expression:

$$\text{delta} + THR \geq = 2TTV,$$

where THR is the high resolution display frame period and TTV is the television field period.

38. Apparatus as set forth in claim 27 wherein (m) equals three and wherein (n) equals three, four or eight.

39. Apparatus as set forth in claim 35 and further comprising means coupled to the plurality of television line buffer means for altering an order with which contents of the line buffer means are presented to the receiving and generating means.

* * * * *

UNITED STATES PATENT AND TRADEMARK OFFICE
CERTIFICATE OF CORRECTION

PATENT NO. : 5,291,275
DATED : Mar. 1, 1994
INVENTOR(S) : Lumelsky

It is certified that error appears in the above-identified patent and that said Letters Patent is hereby corrected as shown below:

On column 21, line 36, both "mans" should be --means--.

On column 22, line 38, delete "includes" and insert --is comprised of--.

On column 23, line 27, delete "position" and insert --portion--.

On column 24, line 21, "mans" should be --means--.

Signed and Sealed this

Nineteenth Day of July, 1994

Attest:

BRUCE LEHMAN

*Attesting Officer*  *Commissioner of Patents and Trademarks*